US008244065B2

(12) United States Patent
Narukawa

(10) Patent No.: US 8,244,065 B2
(45) Date of Patent: Aug. 14, 2012

(54) INFORMATION PROCESSING APPARATUS INCLUDING PRINT JOB RETRIEVAL FUNCTION, INFORMATION PROCESSING METHOD, PROGRAM, AND RECORDING MEDIUM

(75) Inventor: Tomoko Narukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1281 days.

(21) Appl. No.: 11/953,636

(22) Filed: Dec. 10, 2007

(65) Prior Publication Data

US 2008/0151293 A1 Jun. 26, 2008

(30) Foreign Application Priority Data

Dec. 22, 2006 (JP) .................................. 2006-346198

(51) Int. Cl.
*G06K 9/36* (2006.01)
*G06K 15/00* (2006.01)
*G06F 3/12* (2006.01)

(52) U.S. Cl. ........................ 382/284; 358/1.14; 358/1.15
(58) Field of Classification Search .................. 382/260, 382/284; 358/1.14, 403, 1.15; 709/218, 709/219
See application file for complete search history.

(56) References Cited

U.S. PATENT DOCUMENTS

| 5,995,721 | A * | 11/1999 | Rourke et al. ............... 358/1.15 |
| 6,641,312 | B1 * | 11/2003 | Chang et al. .................... 400/76 |
| 7,187,461 | B2 * | 3/2007 | Schlonski et al. ........... 358/1.15 |
| 7,242,488 | B2 * | 7/2007 | Matsueda .................... 358/1.14 |
| 7,595,907 | B2 * | 9/2009 | Carney et al. ................ 358/1.15 |
| 7,742,185 | B2 * | 6/2010 | Lofthus et al. .............. 358/1.15 |
| 2002/0196463 | A1 | 12/2002 | Schlonski et al. |
| 2006/0221359 | A1 * | 10/2006 | Mokuya ......................... 358/1.1 |
| 2007/0236723 | A1 * | 10/2007 | Gaertner et al. ............. 358/1.15 |

FOREIGN PATENT DOCUMENTS

| CN | 1687922 A | 10/2005 |
| EP | 0917042 A2 | 5/1999 |
| JP | 09-233239 A | 9/1997 |
| JP | 2002361970 A | 12/2002 |
| JP | 2005039411 A | 2/2005 |
| JP | 2006-228011 A | 8/2006 |
| KR | 1020040058105 A | 7/2004 |
| WO | 2002/076175 A2 | 10/2002 |

OTHER PUBLICATIONS

Multiple Approximate String Matching, ISSN 0302-9743 (Print), vol. 1272/1997, 12 pages.
Baeza-Yates R et al: "Multiple approximate string matching" Algorithms and Data Structures. 5TH International Workshop, WADS '97 Proceedings Springer-Verlag Berlin, Germany, [Online] 1997, pp. 174-184, XP002477256 ISBN: 3-540-63307-3.

\* cited by examiner

*Primary Examiner* — Claire X Wang
*Assistant Examiner* — Andrae S Allison
(74) *Attorney, Agent, or Firm* — Canon U.S.A., Inc. IP Division

(57) ABSTRACT

An information processing apparatus includes a designation input unit configured to designate a storage area of a print job to be retrieved from among a plurality of types of storage areas that store print jobs, a retrieval condition input unit configured to input a retrieval condition, a retrieval unit configured to extract, from print jobs that are stored in the storage area designated by the designation input unit, a print job based on the retrieval condition input by the retrieval condition input unit, and a display control unit configured to cause a display unit to display the print job extracted by the retrieval unit as a retrieval result.

15 Claims, 24 Drawing Sheets

FIG. 7
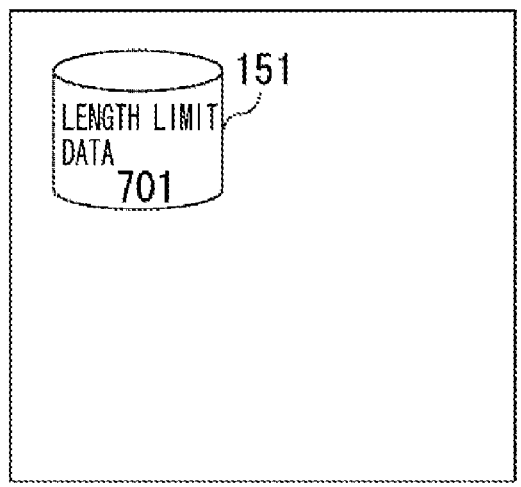
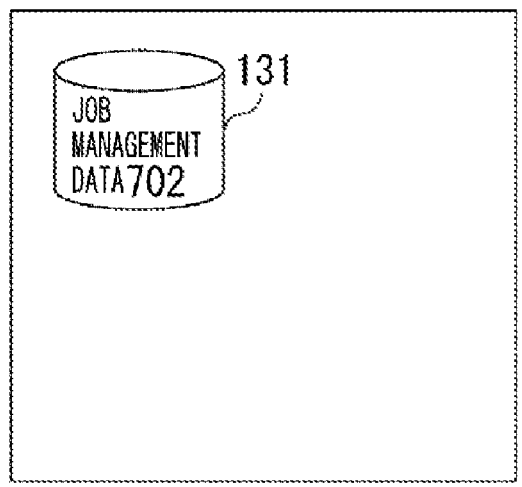
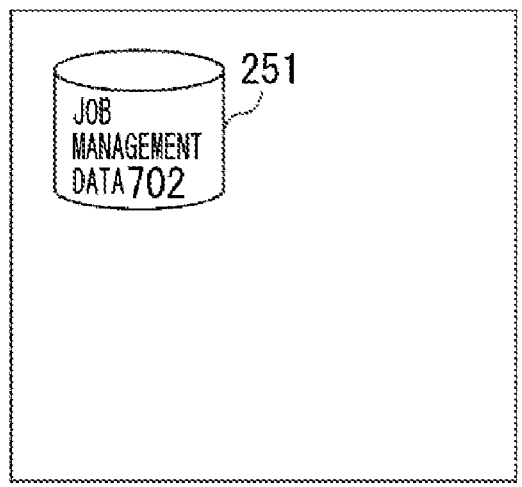

FIG. 9

| JOB ID | JOB NAME | USER NAME |
|---|---|---|
| 0001 | JOBNAME-0616-Job2222 | UserN |
| 0002 | JOBNAME-0531-Job3333 | UserN |
| 0003 | JOBNAME-0427-Job0123 | UserN |
| 0004 | JOBNAME-0331-Job1111 | UserN |
| 0005 | JOBNAME-0707-Job7777 | UserN |
| 0006 | JOBNAME-0527-Job0123 | UserN |
| 0007 | JOBNAME-0427-Job0123 | UserN |
| 0008 | JOBNAME-0331-Job1111 | UserN |
| 0009 | JOBNAME-0707-Job7777 | UserN |
| 0010 | JOBNAME-0527-Job0123 | UserN |

| JOB STORAGE UNIT | JOB NAME LENGTH LIMIT | USER NAME LENGTH LIMIT |
|---|---|---|
| JOB STORAGE UNIT — CLIENT PC | 32byte | 28byte |
| HOLD JOB STORAGE UNIT — PRINTER A | 20byte | 24byte |
| BOX JOB STORAGE UNIT — PRINTER A | 24byte | 22byte |
| HOLD JOB STORAGE UNIT — PRINTER B | 20byte | 24byte |
| BOX JOB STORAGE UNIT — PRINTER B | 24byte | 22byte |

FIG. 15

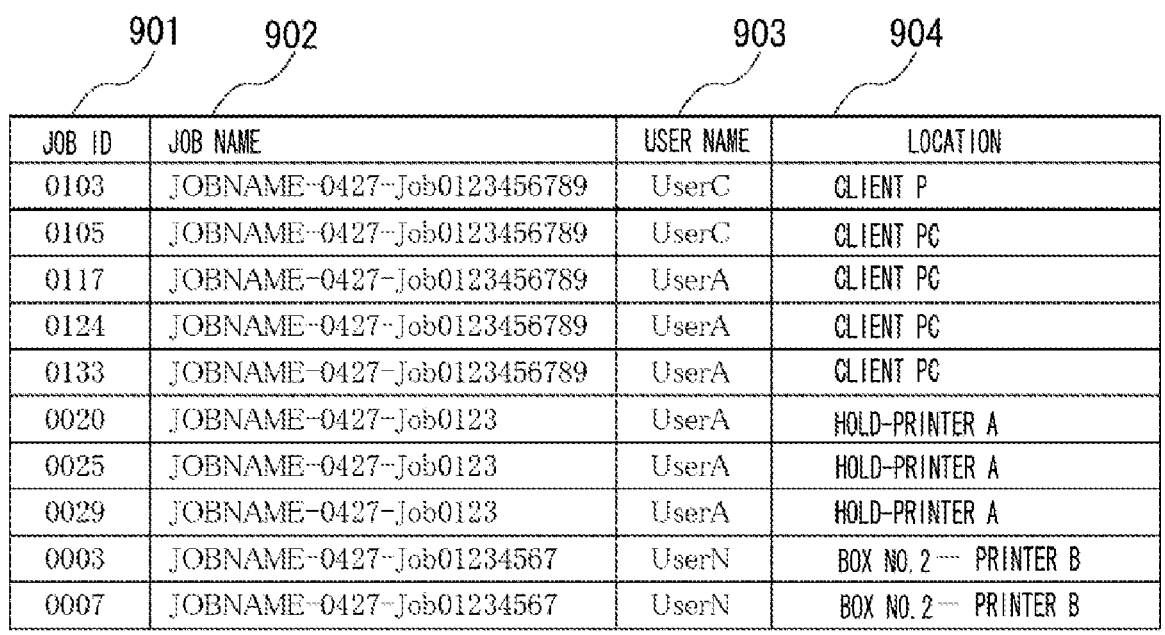

| JOB ID | JOB NAME | USER NAME | LOCATION |
|---|---|---|---|
| 0103 | JOBNAME-0427-Job0123456789 | UserC | CLIENT P |
| 0105 | JOBNAME-0427-Job0123456789 | UserC | CLIENT PC |
| 0117 | JOBNAME-0427-Job0123456789 | UserA | CLIENT PC |
| 0124 | JOBNAME-0427-Job0123456789 | UserA | CLIENT PC |
| 0133 | JOBNAME-0427-Job0123456789 | UserA | CLIENT PC |
| 0020 | JOBNAME-0427-Job0123 | UserA | HOLD-PRINTER A |
| 0025 | JOBNAME-0427-Job0123 | UserA | HOLD-PRINTER A |
| 0029 | JOBNAME-0427-Job0123 | UserA | HOLD-PRINTER A |
| 0003 | JOBNAME-0427-Job01234567 | UserN | BOX NO.2 — PRINTER B |
| 0007 | JOBNAME-0427-Job01234567 | UserN | BOX NO.2 — PRINTER B |

901 — JOB ID
902 — JOB NAME
903 — USER NAME
904 — LOCATION

INFORMATION PROCESSING APPARATUS INCLUDING PRINT JOB RETRIEVAL FUNCTION, INFORMATION PROCESSING METHOD, PROGRAM, AND RECORDING MEDIUM

BACKGROUND OF THE INVENTION

1. Field of the Invention

The present invention relates to a technique for retrieving a print job, which is a file or set of files that can be submitted to be printed out by a printing apparatus.

2. Description of the Related Art

Conventionally, a client personal computer (PC) performs reprinting by first storing in the client PC a print job which the client PC sent to a printing apparatus. The client PC later re-sends the print job to the printing apparatus to execute the print job. Japanese Patent Application Laid-Open No. 2006-228011 discusses another method of reprinting in which a print job is stored in a hard disk (HD) of a printing apparatus, and a user later instructs the printing apparatus to reprint the stored print job.

In Japanese Patent Application Laid-Open No. 2006-228011, a plurality of print jobs is stored in a HD of the printing apparatus, and a user can later instruct the printing apparatus to reprint a desired print job.

However, it is burdensome for a user to find the desired print job when there is a plurality of print jobs stored in the HD. To solve such a problem, Japanese Patent Application Laid-Open No. 09-233239 discusses a technology for retrieving a print job desired by a user. By using the technology discussed in Japanese Patent Application Laid-Open No. 09-233239, a user can designate the IP address of a source, such that print jobs can be narrowed down to jobs from a specific source.

Print jobs as described above can be stored in various locations (areas), such as a client PC, in addition to the HD in the printing apparatus. Therefore, when a user retrieves a desired print job, it is useful that print job retrieval can be flexibly performed according to the various storage locations of the print jobs.

Moreover, when a user performs retrieval of a print job from various locations, the size of a job attribute value (such as a limit on the number of characters in a character string) that is provided by a printing apparatus may differ from that of a job attribute value that is provided by a client PC.

For example, a printing apparatus stores a received job in a HD. On the other hand, the printing apparatus caches job information in a read-only memory (RAM) to improve the performance. Job information, such as a job name or a user name, is used for displaying the stored job on a displaying operation unit. If the HD is accessed and scanned every time the printing apparatus displays job information, the speed of displaying job information decreases. On the other hand, a data storage area that is allocated to a RAM for storing job information is small. Therefore, a printing apparatus controls the amount of job information by, for example, setting a certain limit to the length of a job name.

Furthermore, the size of a job name character string that can be displayed on an operation panel of the printing apparatus may be limited to some extent as compared to that on a monitor of a client PC. Therefore, the job information size in a client PC may differ from that in a printing apparatus.

Moreover, a job has a plurality of job attributes, and the length limit of a character string may differ with each job attribute. For example, it is likely that character string lengths of a job name and a user name are different (i.e., the maximum length of a user name is likely to be shorter than that of a job name). In such a case, a character string length limit is not set to correspond to the longest length limit of a job attribute. Instead, since a character string of a user name is assumed to be shorter than that of a job name, the length limit of a user name may be set as a smaller value. Similarly, in a case where a plurality of job attributes (such as job name and user name) are set as search target job attributes, the desired job cannot be extracted if the search string is compared to character strings that correspond to all search target job attributes.

SUMMARY OF THE INVENTION

According to an aspect of the present invention, an information processing apparatus includes a designation input unit configured to designate a storage area of a print job to be retrieved from among a plurality of types of storage areas that store print jobs, a retrieval condition input unit configured to input a retrieval condition, a retrieval unit configured to extract, from print jobs that are stored in the storage area designated by the designation input unit, a print job based on the retrieval condition input by the retrieval condition input unit, and a display control unit configured to cause a display unit to display the print job extracted by the retrieval unit as a retrieval result.

According to an exemplary embodiment of the present invention, print job retrieval can be performed in various print job storage locations.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an arrangement of length limit data and job management data in the print control system illustrated in FIG. 6 according to an exemplary embodiment of the present invention.

FIG. 9 illustrates an example of job management data stored in the job storage unit illustrated in FIG. 7 according to an exemplary embodiment of the present invention.

FIG. 15 illustrates an example of a job list of retrieval results, in which job extraction lists as illustrated in FIG. 14 are merged, according to the first exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
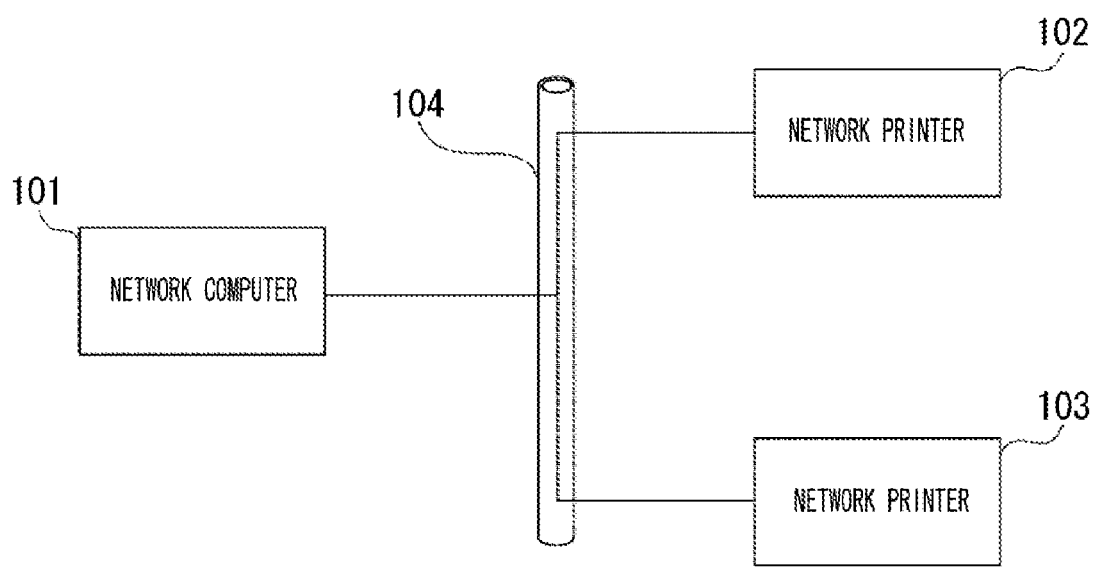
FIG. 1 illustrates an example of an entire configuration of a printing system according to an exemplary embodiment of the present invention.

FIG. 1 illustrates an example of an entire configuration of a printing system according to an exemplary embodiment of the present invention.

Referring to FIG. 1, a network computer 101 serving as an information processing apparatus is connected to a network 104 via a network cable. The network computer 101 can communicate with network printers 102 and 103 (such as a printing apparatus or an image forming apparatus) serving as external devices, and manages a plurality of printers connected to the network 104.

The network computer 101 is a general information processing apparatus and stores an executable print control program.

Furthermore, the network computer 101 includes a function for sending a print job including print data to the network printer 102 or 103 in response to a print request. Further, the network computer 101 includes functions for obtaining status information of the network printers 102 and 103, and various information on a print job, and for notifying a user or other devices connected to the network 104 of such obtained information.

The network printers 102 and 103 are connected to the network 104 via a network cable. The network printers 102 and 103 analyze a print job, including print data, which is sent from the network computer 101. The network printers 102 and 103 then convert each page of the print job into a dot image and perform printing page by page. Further, the network printers 102 and 103 can provide the network computer 101 with a print job management function defined by ISO10175 (DPA: Document Printing Application). All or some of the functions that are performed by the network computer 101 can be included in the network printers 102 and 103 or in a network interface card of the network computer 101.

The network 104 is connected to the network computer 101 and the network printers 102 and 103. The network 104 can be a wired or a wireless network.

In FIG. 1, only one network computer 101 is connected to the network 104. However, a plurality of network computers can be connected to the network 104. Additionally, the number of network printers connected to the network 104 is not limited to two, and one or a plurality of network printers can be connected to the network 104. Moreover, the network printers 102 and 103 can be printers of any of the various printing methods, such as a laser beam printer applying an electrophotographic method or an inkjet printer.

Figure 2:
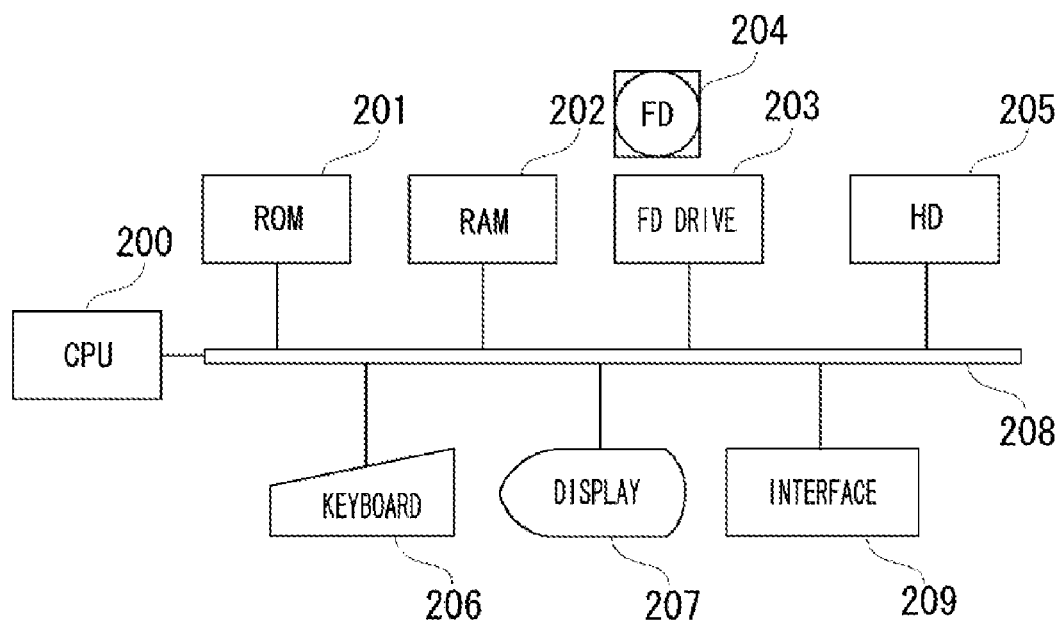
FIG. 2 illustrates a block diagram of a configuration of an information processing apparatus illustrated in FIG. 1 according to an exemplary embodiment of the present invention.

FIG. 2 illustrates a configuration of an information processing apparatus, which is a block diagram of a hardware configuration of the network computer 101 illustrated in FIG. 1.

A central processing unit (CPU) 200 is a control unit of the information processing apparatus. The CPU 200 can execute application programs, printer driver programs, an operating system (OS), and a network printer control program, which are stored in a HD 205. Additionally, the CPU 200 controls a RAM 202 to temporarily store necessary information and files for executing a program.

A read-only memory (ROM) 201 stores programs, such as a basic input/output (I/O) program, or various data (e.g., font data and template data).

The RAM 202 is a temporary data storage unit, which functions as a main memory or a work area of the CPU 200.

Figure 5:
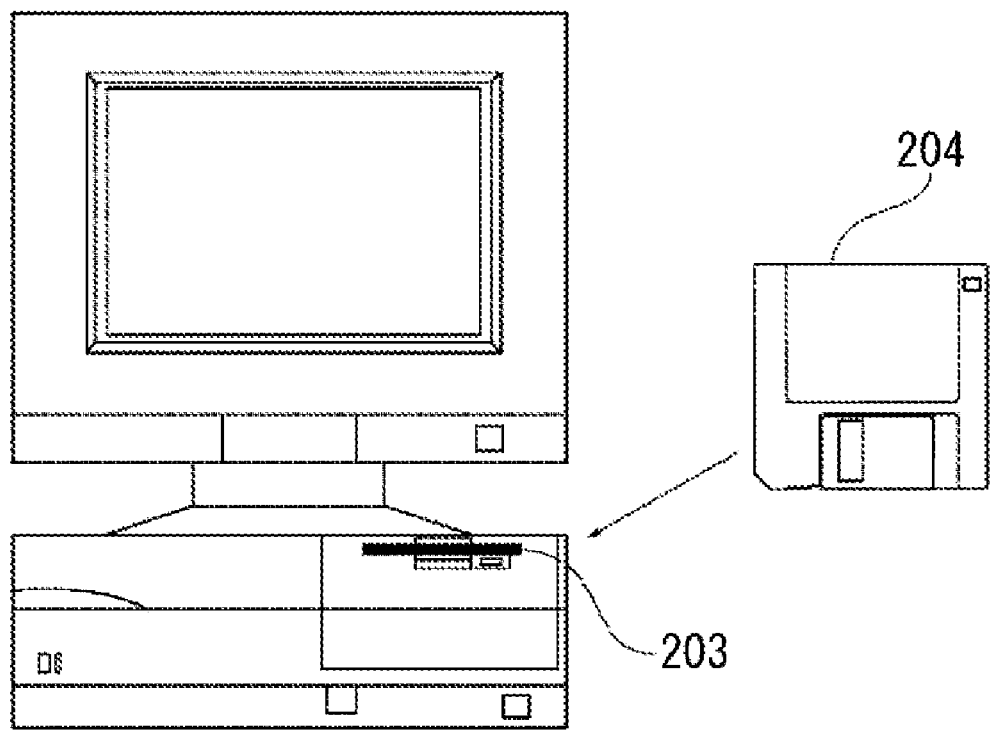
FIG. 5 illustrates the relationship between an FD drive illustrated in FIG. 2 and an FD, which can be inserted into the FD drive, according to an exemplary embodiment of the present invention.

An FD drive 203 reads a recording medium and can load programs stored in an FD 204 onto the information processing apparatus, as illustrated in FIG. 5 to be described below. The recording medium is not limited to an FD and can be any of a compact disc-ROM (CD-ROM), a CD-recordable (CD-R), a CD-rewritable (CD-RW), a digital versatile disc (DVD), a DVD-ROM, an integrated circuit (IC) memory card, a magnetooptic disc (MO), or a memory stick.

The floppy disk 204 is a recording medium that stores a computer-readable program.

The HD 205 is an external storage unit that functions as a large capacity memory. The HD 205 stores application programs, printer driver programs, OS, network printer control programs, and related programs. Moreover, the HD 205 stores a spooler.

A keyboard 206 is used by a user to input an instruction, such as a device control command.

A display 207 displays a command which a user inputs through the keyboard 206 or a status of a print job which is obtained from the network printer 102 or 103. Additionally, the display 207 displays a retrieval result of a print job, which will be described below with reference to flowcharts. A system bus 208 controls the flow of data inside the network computer 101. An interface 209 is an input/output unit, and the information processing apparatus can transmit and receive data to or from an external device via the interface 209.

Figure 3:
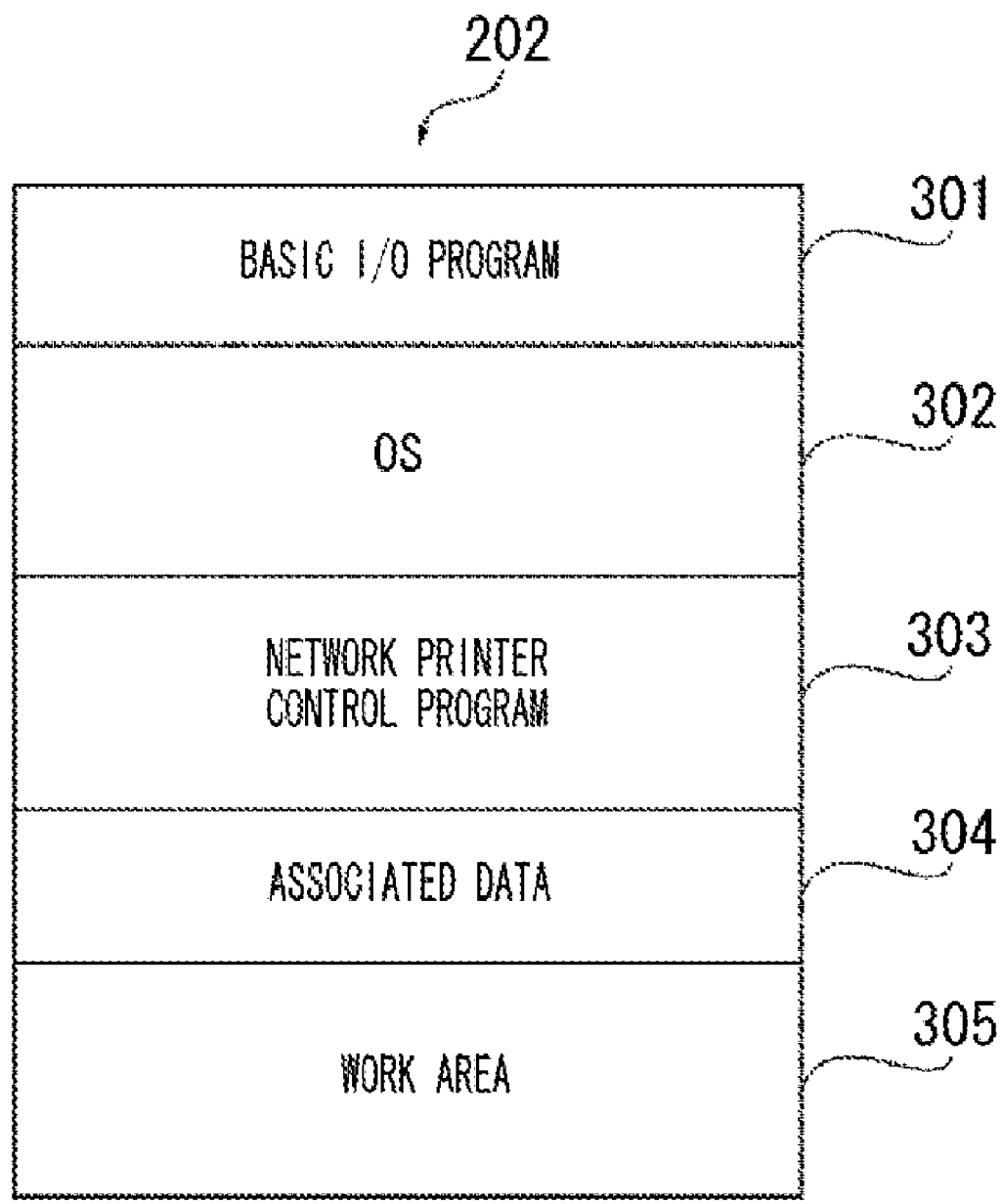
FIG. 3 illustrates an example of a memory map of a random access memory (RAM) illustrated in FIG. 2 according to an exemplary embodiment of the present invention.

FIG. 3 illustrates an example of a memory map of the RAM 202 illustrated in FIG. 2. The memory map indicates that the above-described network printer control program, which is loaded from the FD 204 onto the RAM 202, is in an executable state.

The present exemplary embodiment describes an example in which a network printer control program and associated data are directly loaded from the FD 204 onto the RAM 202 and are executed. A network printer control program can also be loaded from the HD 205, in which the program is already stored, onto the RAM 202, each time the network printer control program is to be loaded from the FD 204. Moreover, the network printer control program can be stored in a medium other than an FD, such as a CD-ROM, a CD-R, a PC card, a DVD, or an IC memory card. Furthermore, the network printer control program can be stored in the ROM 201, and the CPU 200 can directly execute the program by configuring the network printer control program in the ROM 201 to be a part of the memory map. Furthermore, software that realizes the functions of each of the above-described devices can be an alternative to the hardware devices.

The network printer control program according to the present exemplary embodiment can be simply referred to as a print control program. A print control program includes a control program for a client to instruct a change in the print location of a print job or a change in the order of printing. Additionally, a print control program includes a control program used in a print server to control the order of print jobs, notify the end of a print job, or send a request to change a printing location. Moreover, the print control program of the present exemplary embodiment can be separated into two modules, i.e., a module installed in a client and a module installed in a print server. Furthermore, a single print control program can function as a client program or a print server program, depending on the environment in which the program is executed. Furthermore, a module including the functions for a client and a module including the functions for a server can be installed in a computer. Consequently, the computer can simultaneously execute the two modules, or virtually execute the two modules in parallel by time-division.

A basic I/O program 301 includes an initial program loading (IPL) function which loads an OS from the HD 205 onto the RAM 202, and starts execution of the OS when the information processing apparatus is switched on. An OS 302, a network printer control program 303, and associated data 304 are stored in the respective areas in the RAM 202. A work area 305 is used by the CPU 200 when executing the network printer control program 303 in the present exemplary embodiment.

Figure 4:
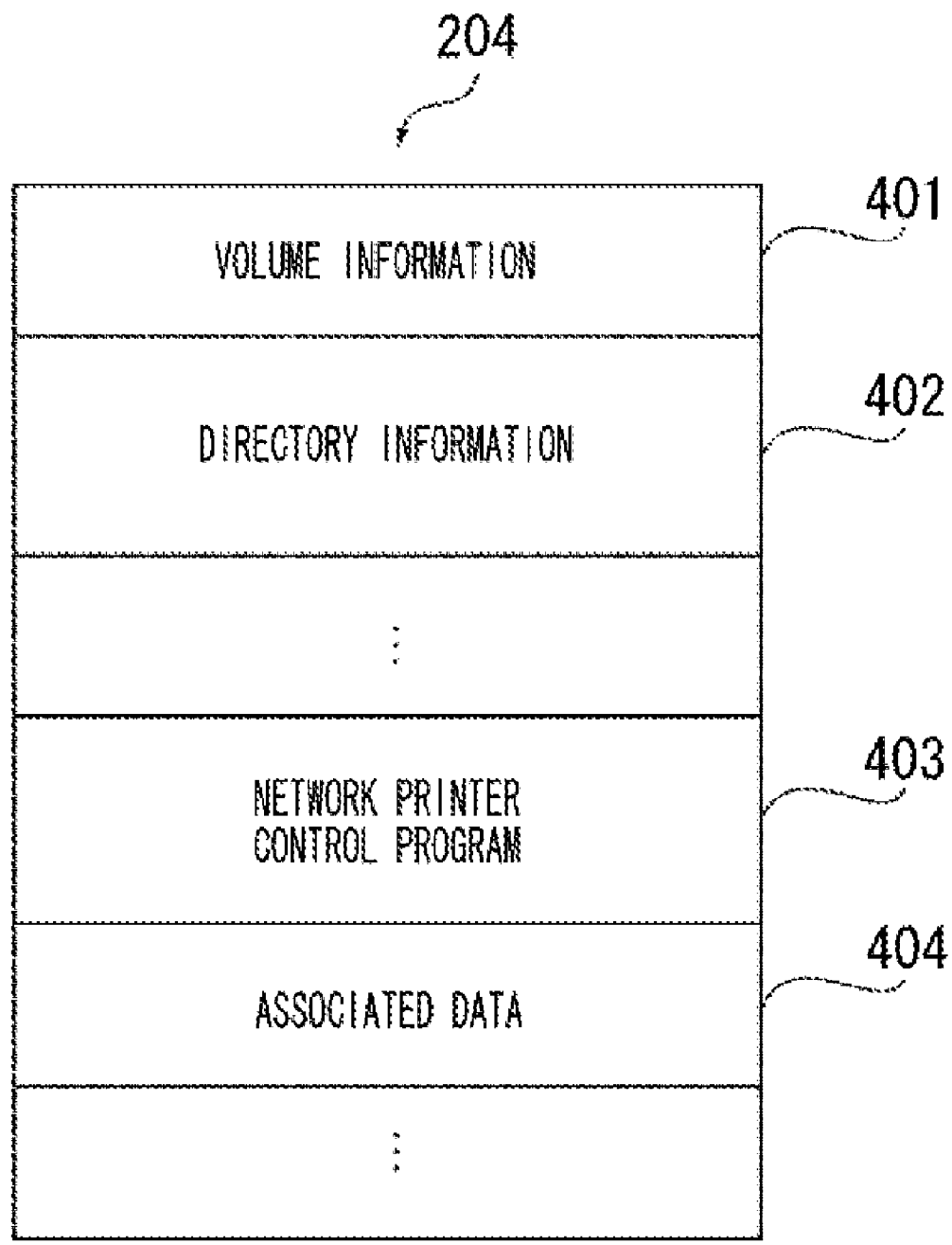
FIG. 4 illustrates an example of a memory map of a floppy disk (FD) illustrated in FIG. 2 according to an exemplary embodiment of the present invention.

FIG. 4 illustrates an example of a memory map of the FD 204 illustrated in FIG. 2. The memory map of FIG. 4 includes volume information 401 that indicates information on the volume of data, and directory information 402. The memory map further includes a network printer control program 403 that is a print control program to be described below with regard to the present exemplary embodiment, and associated data 404 of the network printer control program 403. The network printer control program 403 is programmed based on a flowchart to be described below with respect to the present exemplary embodiment.

FIG. 5 illustrates the relationship between the FD drive 203 illustrated in FIG. 2 and the FD 204, which can be inserted into the FD drive 203. In FIG. 5, the FD 204 stores a network printer control program and associated data, which are described below in the present exemplary embodiment.

Figure 6:
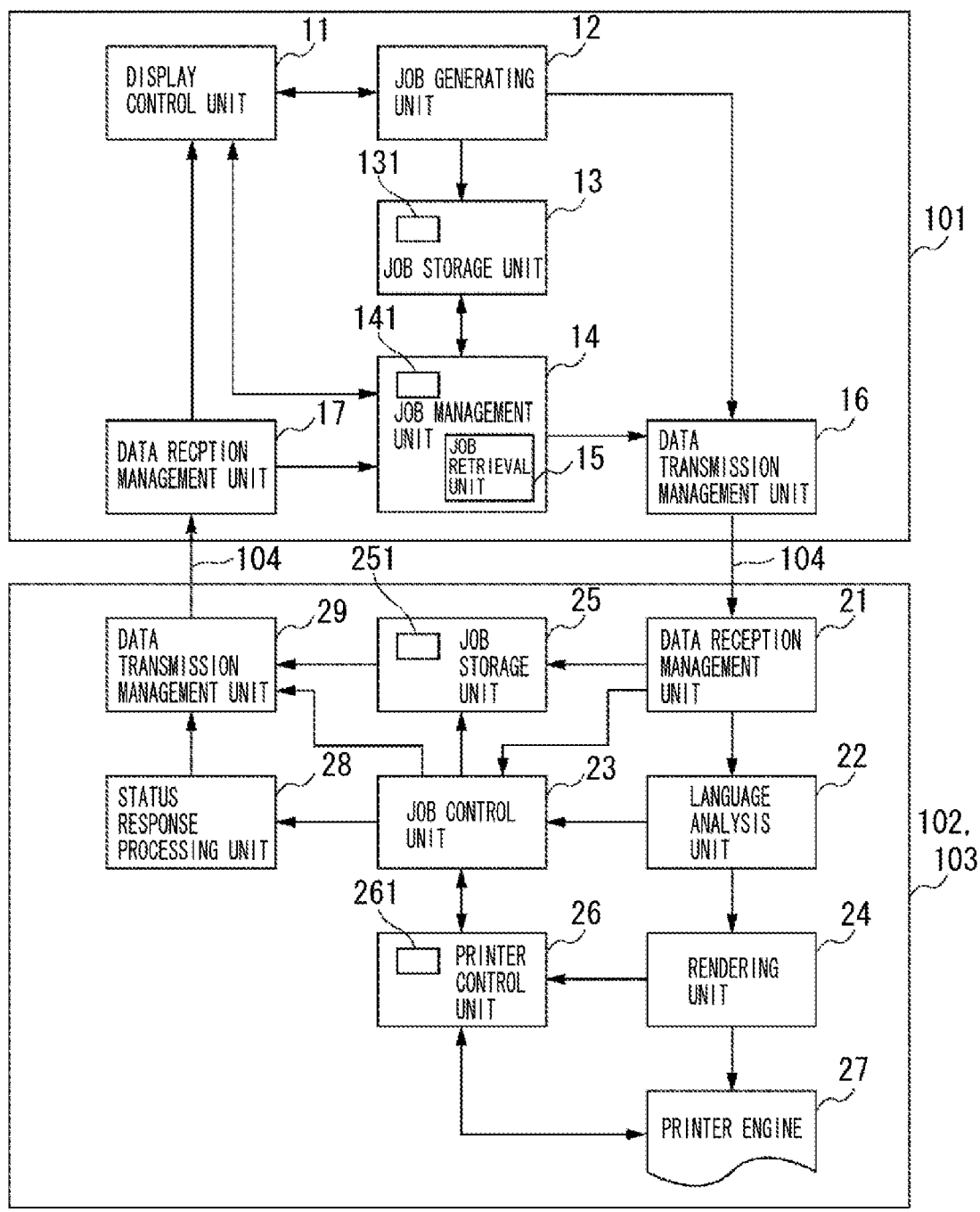
FIG. 6 illustrates a block diagram of software functions in a print control system according to an exemplary embodiment of the present invention.

FIG. 6 illustrates a block diagram of software functions of a print control system according to the present exemplary embodiment. In FIG. 6, the network computer 101 is physically or logically connected to the network printers 102 and 103 directly or via a network, such as the Internet or an intranet, by a communication cable that allows bidirectional communication. Reference numerals 101 to 104 in FIG. 6 correspond to the reference numerals 101 to 104 in FIG. 1. Configurations of a network on a computer-side and a printing apparatus-side associated with print job retrieval will be described below.

Generally, a print job is a unit of a process in a printing apparatus and conceptually indicates a set of processes in a printing apparatus. In the present embodiment, the entity of a print job to be retrieved is data associated with the print job. The data associated with a print job is all or a part of data, such as rendering data, print setting data, and print job attributes, that are used in a set of processes performed by a printing apparatus. Further, the entity of a print job displayed as a retrieval result in the present exemplary embodiment is information that indicates data of the print job (such as bibliographic information of a print job, e.g., print job name), rather than print job data itself. Information for specifying a print job other than bibliographic information of a print job can also be applied as appropriate as information of the retrieval result.

In the network computer 101, a display control unit 11 displays information obtained from the network printer 102 or 103 on the display 207. The display control unit 11 receives a user input of a print job setting or an instruction to perform a print job. A user can specify retrieval conditions, such as a search string, a search target job attribute, and a search target location, via a graphical user interface (GUI) that is displayed on the display 207 by the display control unit 11. Moreover, the display control unit 11 displays a job list as a retrieval result on the display 207.

A job generating unit 12 converts a word processing document or a spreadsheet document into print job data of a format corresponding to a printing apparatus, and transfers the print job to a data transmission management unit 16. Moreover, a print job generated by the job generating unit 12 is stored in a job storage unit 13. The job storage unit 13 is also referred to as a client job storage unit since it is a job storage unit included in the client side.

The job storage unit 13 stores a print job generated by the job generating unit 12 and job management data 702 (illustrated in FIG. 7 to be described below), which is configuration information of a print job. Upon receiving a job information obtaining request from a job management unit 14, the job storage unit 13 transfers the job management data 702 to the job management unit 14.

Moreover, a job management data memory 131 in the job storage unit 13 stores print data and job management data 702 that correspond to a print job generated by the job generating unit 12. The job management data 702 includes a plurality of job attributes, which is managed for each print job. The job management data 702 is generated when a print job is stored in the job storage unit 13, and is deleted when a print job is deleted from the job storage unit 13. Print job retrieval is performed by comparing a character string of a job attribute included in the job management data 702 with a search string.

The job management unit 14 obtains print job information from the network printer 102 or 103 using the data transmission management unit 16 and a data reception management unit 17. Further, the job management unit 14 generates a job operation command, such as executing, stopping, or canceling, of a print job to the network printer 102 or 103. Furthermore, the job management unit 14 can obtain information of print jobs that are stored in the job storage unit 13. A print job stored in a job storage unit 25 of the network printer 102 or 103 or in the job storage unit 13 of the network printer 101 can be reprinted responsive to a reprint command that is generated by the job management unit 14.

A length limit data memory 141 in the job management unit 14 stores length limit data 701. The length limit data 701 is a list of length limits of character strings corresponding to the job attributes included in the job management data 702 stored in each job storage unit. By referencing the length limit data 701, the job management unit 14 can specify the length limit of a character string corresponding to each job attribute included in the job management data 702 stored in each job storage unit.

A job retrieval unit 15 receives a retrieval condition from the display control unit 11, and filters print jobs in each job storage unit according to the received retrieval condition. The job retrieval unit 15 then merges the refined lists of print jobs in each of the job storage units and supplies the merged list to the display control unit 11.

The job management unit 14 sends a print job, a job operation command, and a job information obtaining command to the network printer 102 or 103 via the data transmission management unit 16. The job management unit 14 receives a reply to the job operation command or the job information obtaining command from the network printer 102 or 103 via the data reception management unit 17.

All or a part of the functions of the network computer 101 can be included in a host computer, the network printer 102 or 103, or another computer, such as a server computer.

In the network printer 102 or 103, a data reception management unit 21 receives a print job, a job operation command, and a job information obtaining command from the network computer 101.

A language analysis unit 22 thoroughly analyzes a content of a print job and executes a control command for performing job management or rendering according to the print job setting.

To be more precise, the language analysis unit 22 receives each command group in order from the data reception management unit 21 and determines the process requested by the received command according to the description rule of the printer control language. If the language analysis unit 22 determines that the received command is a job operation command, such as start or end of a print job, or a job attribute, such as paper size, number of copies, or stapling, the language analysis unit 22 generates an appropriate control instruction to a job control unit 23. If the received command indicates rendering of a character, graphics, or an image, the language analysis unit 22 instructs rendering to a rendering unit 24.

The job control unit 23 schedules and controls each print job sent from the network computer 101 according to the job control instruction received from the language analysis unit 22. Upon receiving an instruction to start the job, the job control unit 23 stores the print job in the job storage unit 25. Moreover, the job control unit 23 performs various operations on the print job stored in the job storage unit 25 according to an instruction from the network computer 101, regardless of whether the job control unit 23 received an instruction to end the job. For example, the job control unit 23 can execute reprinting, change a job attribute, change the order of priority in the schedule (i.e., order of printing), or cancel printing (i.e., deleting a print job).

Furthermore, the job control unit 23 generates an instruction to a printer control unit 26 to select printing paper or a paper discharge bin according to attributes of the print job to be performed. In addition, the job control unit 23 obtains the status of the apparatus 102 or 103 via the printer control unit 26 and monitors the status of the print job being performed. If an error occurs during printing, the job control unit 23 generates a notification status as necessary. Upon receiving a command to reprint a print job from the network computer 101, the job control unit 23 obtains the print job data from the job storage unit 25 and reprints the print job.

The job storage unit 25 stores print jobs and job management data 702, which is configuration information of the print jobs stored in the job storage unit 25. A job management data memory 251 in the job storage unit 25 stores the print job data and the job management data 702. Upon receiving a job information obtaining request form the network computer 101, the job storage unit 25 sends the job management data 702 to the network computer 101. Moreover, upon receiving a request to perform reprinting from the job control unit 23, the job storage unit 25 is operated to reprint a corresponding print job.

The rendering unit 24 renders and outputs characters, graphics, and images to be printed. The rendering unit 24 generates character patterns, calculates graphics, and rasterizes image data according to a rendering output instruction from the language analysis unit 22. The rendering unit 24 rasterizes the received data into an output data format and sends the rasterized data to a printer engine 27.

The printer engine 27, such as a laser beam printer engine based on an electrophotographic method, performs actual printing according to the rasterized data received from the rendering unit 24. The printer engine 27 includes a unit that detects the remaining amount of recording paper. If recording paper is not set, the printer engine 27 sends a warning signal to the printer control unit 26. In addition, if there is no recording paper when rendering or printing is to be performed, the printer engine 27 stops a recording unit, such as a printer drum, and sends an error message to the printer control unit 26 via interrupt processing.

The printer control unit 26 selects recording paper to be printed, or performs printer control, such as initializing a printer, according to a printer control instruction from the job control unit 23. Moreover, the printer control unit 26 constantly monitors the overall status of a printer apparatus, such as status of the paper feed cassette, whether a door is open, or the amount of remaining toner. Consequently, the printer control unit 26 notifies other components of the status of the printer apparatus as necessary. The latest status of the printer apparatus, such as the remaining amount of paper or an error, is stored in a printer information management memory 261 in the printer control unit 26.

A status response processing unit 28 receives a status response request from the job control unit 23. The status response processing unit 28 then converts a status notification, which is expressed in an internal format of a printer, into an external expression that is comprehensible by the network computer 101. The status response processing unit 28 then generates status response information, and sends the status response information to a data transmission management unit 29.

The data transmission management unit 29 temporarily stores the status response information received from the status response processing unit 28 in a sending buffer (not illustrated), and sends the status response information to the network computer 101 via the network 104.

All or some of the functions of the network computer 101 can be included in a host computer, the network printer 102 or 103, or another computer, such as a server computer.

FIG. 7 illustrates the arrangement of the length limit data 701 and the job management data 702 in the print control system illustrated in FIG. 6.

The job management data 702 is stored in the job storage unit 13 in the network computer 101 or the job storage unit 25 in the network printer 102 or 103. The job storage units 13 and 25 each store the job management data 702 that corresponds to data of print jobs stored therein. The job management data 702 includes a plurality of job attributes, such as user name and job name.

The job management unit 14 in the network computer 101 stores the length limit data 701. The length limit data 701 indicates the length limit of a character string of each job attribute that is included in the job management data 702 in the job storage unit 13. The length limit data 701 also indicates the length limit of a character string of each job attribute that is included in the job management data 702 in the job storage unit 25 of the network printer 102, which is managed by the job management unit 14.

Figure 8A:
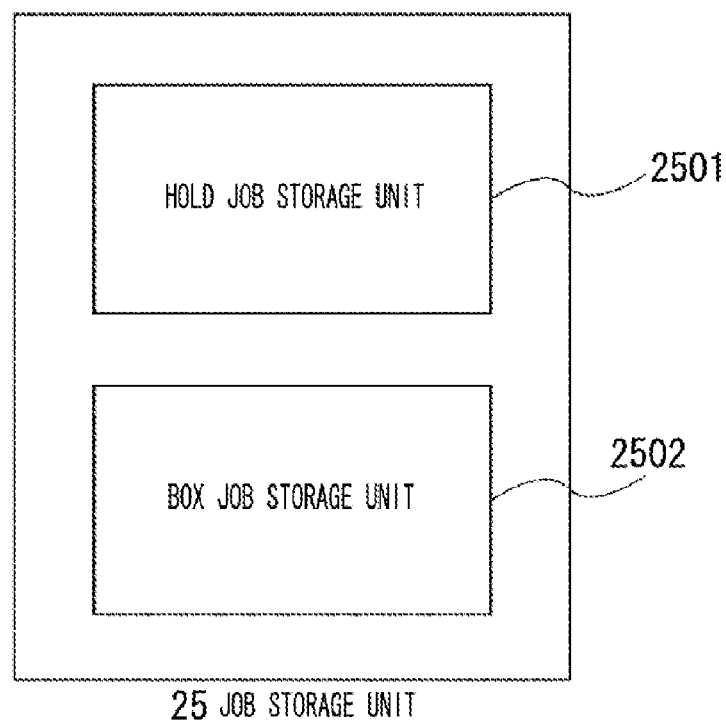
FIG. 8A illustrates a configuration of a job storage unit in a printer, which is one of a plurality of types of print job storage areas.

FIG. 8A illustrates a configuration of the job storage unit 25 in the network printer 102. The job storage unit 25 is one of the various types of print job storage areas. The job storage unit 25 includes a hold job storage unit 2501 and a box job storage unit 2502.

Both the hold job storage unit 2501 and the box job storage unit 2502 include a nonvolatile memory for storing print job data received from the job control unit 23. The hold job storage unit 2501 and the box job storage unit 2502 store print jobs and job management data 702 in the nonvolatile memory. Upon receiving a job data obtaining command from the job control unit 23, the hold job storage unit 2501 and the box job storage unit 2502 send a print job to the job control unit 23. Further, the hold job storage unit 2501 and the box job storage unit 2502 delete job data when receiving a job deletion command from the job control unit 23. The hold job storage unit 2501 and the box job storage unit 2502 generate the job management data 702 when storing a print job, and delete the job management data 702 when deleting the print job data. Upon receiving a job management data obtaining command from the network computer 101, the hold job storage unit 2501 and the box job storage unit 2502 send the job management data 702 to the network computer 101.

Figure 8B:
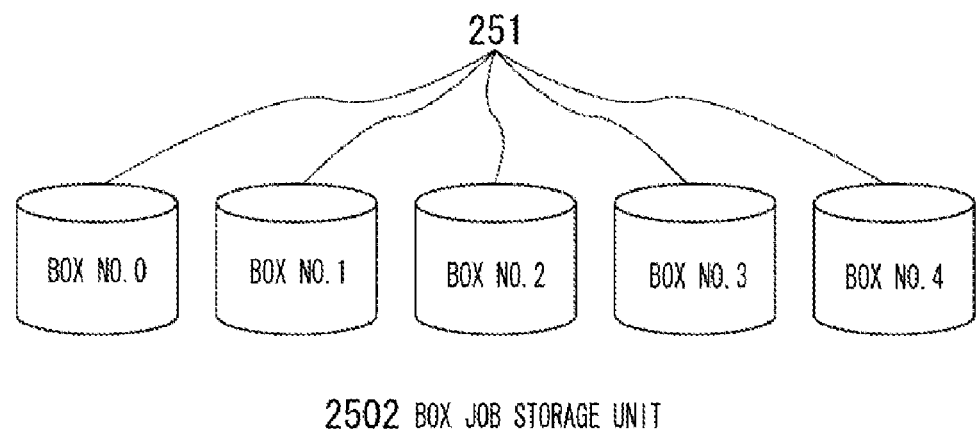
FIG. 8B illustrates a configuration of a box job storage unit in the print control system illustrated in FIG. 6 according to an exemplary embodiment of the present invention.

FIG. 8B illustrates a configuration of the box job storage unit 2502. The box job storage unit 2502 includes a plurality of job information management memories 251. Consequently, the inside of the box job storage unit 2502 can be divided, so that data can be managed for each user. The job information management memory 251 can be utilised as a single unit, or a folder can be assigned to the job information management memory 251, such that each folder is a unit. Further, each of a plurality of job information management memories 251 can be referred to as a box. The box job storage unit 2502 stores a print job and the print job management data 702 in each job information management memory 251 (or box). Since the box job storage unit 2502 is internally divided into predetermined units, the job retrieval unit 15 can obtain a list of the job management data 702 of a specific job information management memory 251 (or box) from a plurality of boxes in the box job storage unit 2502.

The hold job storage unit 2501 is used to temporarily store a print job each time a user adjusts a setting and performs reprinting with a printing apparatus. The user stores a printed print job in the box job storage unit 2502 for a long term to reprint the print job later.

Further, a setting can be made on each box in the box job storage unit 2502. For example, a password can be set to a box, so that a user is requested to enter the password when the user obtains a print job and the job management data 702 in the box. Consequently, an unauthorized access to print job data in the box by other users can be prevented by assigning a box to a user and requesting the user to enter the password. Since the job management data 702 is required for retrieving a print job, a user is required to enter a password when retrieving a print job in a box on which a password is set.

FIG. 9 illustrates an example of a list of the job management data 702 stored in the job storage units 13 and 25. Print job configuration information stored in the job storage units 13 and 25 is registered as job management data 702 of each of the job storage units 13 and 25. When retrieving a print job, the job retrieval unit 15 obtains and references a list of job management data 702 from the search target job storage unit.

FIG. 9 illustrates an example of a list of job management data 702 stored in a box job storage unit 2502 of the network printer 102. The job management data 702 includes a job ID 901 and two job attributes (i.e., job name 902 and user name 903). The job name 902 and user name 903 are job attributes in the form of a character string, and there is a limit to the length (size) of each character string. The length limit of the character string of each job attribute is stored for each job storage unit in the job management unit 14 as length limit data 701, which is described in detail below in FIG. 10.

Figure 10:
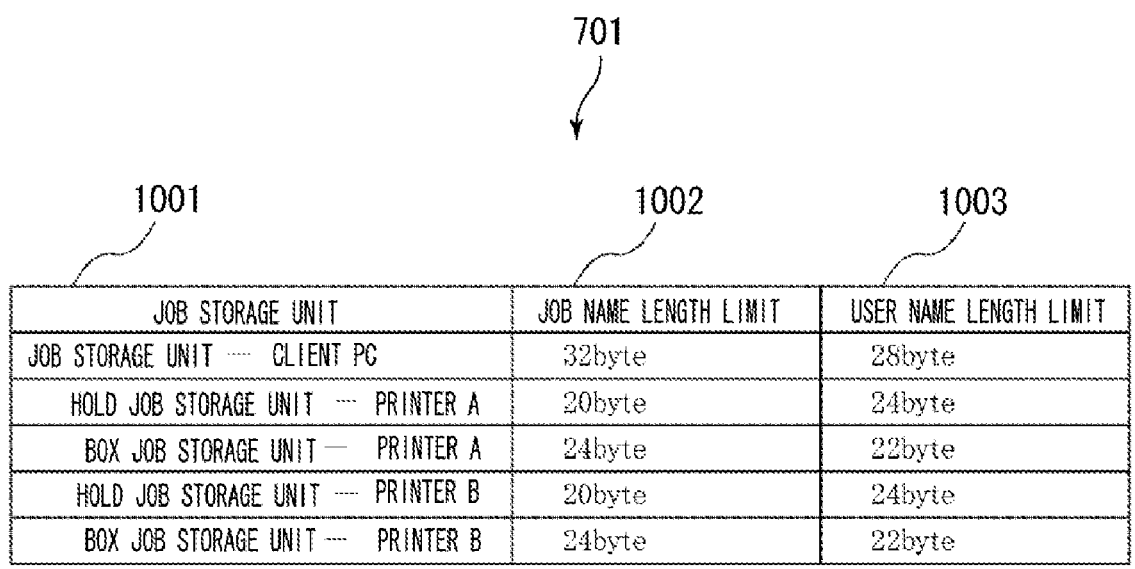
FIG. 10 illustrates an example of a list of length limit data stored in job storage units according to an exemplary embodiment of the present invention.

FIG. 10 illustrates a list of characteristics of each job storage unit (storage area). The characteristic of each job storage unit is based on job attributes of a print job stored in each storage unit. The list functions as an element of a characteristic management unit that manages the characteristic of each of a plurality of types of storage areas for print jobs. In particular, FIG. 10 is a list of length limit data 701 stored in the job management unit 14. As described earlier, the length limit of the character string of each job attribute for each job storage unit is stored in the job management unit 14 as length limit data 701. When retrieving a print job, the job retrieval unit 15 references the length limit data 701 to specify the length limit of a search target job attribute in the search target job storage unit.

Moreover, FIG. 10 illustrates the length limit data 701 of the job management data 702 stored in the job storage unit 13 of the network computer 101 and the hold job storage unit 2501 and the box job storage unit 2502 in the network printer 102 (or printer A in FIG. 10) and the network printer 103 (or printer B in FIG. 10). The length limit data 701 includes a "job storage unit" 1001 and length limits of the character strings corresponding to job attributes included in the job management data 702. The length limits of the character strings are "job name length limit" 1002, which is the length limit of "job name" 902, and "user name length limit" 1003, which is the length limit of "user name" 903.

In addition to length limit data, a characteristic of each storage unit can also include whether a character string of a job attribute is described by a one-byte character or two-byte character, in relation to processing a search string. Such a characteristic indicates whether the job attribute of a print job stored in a storage unit corresponds to either a one-byte character or a two-byte character. In such a case, the characters of a character string which a user enters via an edit box 1201 in the user interface (UI) illustrated in FIG. 12 (to be described below) are automatically processed to one-byte or two-byte characters based on whether the characteristic of the search target location corresponds to a one-byte or two-byte character.

A print job retrieval process will be described below with reference to a flowchart illustrated in FIG. 11. A print job can be retrieved according to a retrieval condition that is processed based on the characteristic of a print job storage location (illustrated in FIG. 10), which is designated via the UI illustrated in FIG. 12 (to be described below).

In step S1101, the job retrieval unit 15 in the network computer 101 obtains a retrieval condition, i.e., a search string, search target job attribute, and search target location. A user inputs the retrieval condition via a retrieval condition designating UI (illustrated in FIG. 12), which is displayed by the display control unit 11. The retrieval condition designating UI will be described below.

The search target job attribute includes two job attributes ("job name" 902 and "user name" 903) in the job management data 702 illustrated in FIG. 9. The search target job attribute is a job attribute whose character string is compared with the search string.

The search target location is a storage area that stores a print job. To be more precise, the job storage unit 13 in the network computer 101, the hold job storage unit 2501, the box job storage unit 2502, or a specific box in the box job storage unit 2502 in the network printers 102 and 103 can be designated as a search target location. Furthermore, other storage units can be added. Details on the search target location will be described in the description of the retrieval condition designation UI.

Figure 12:
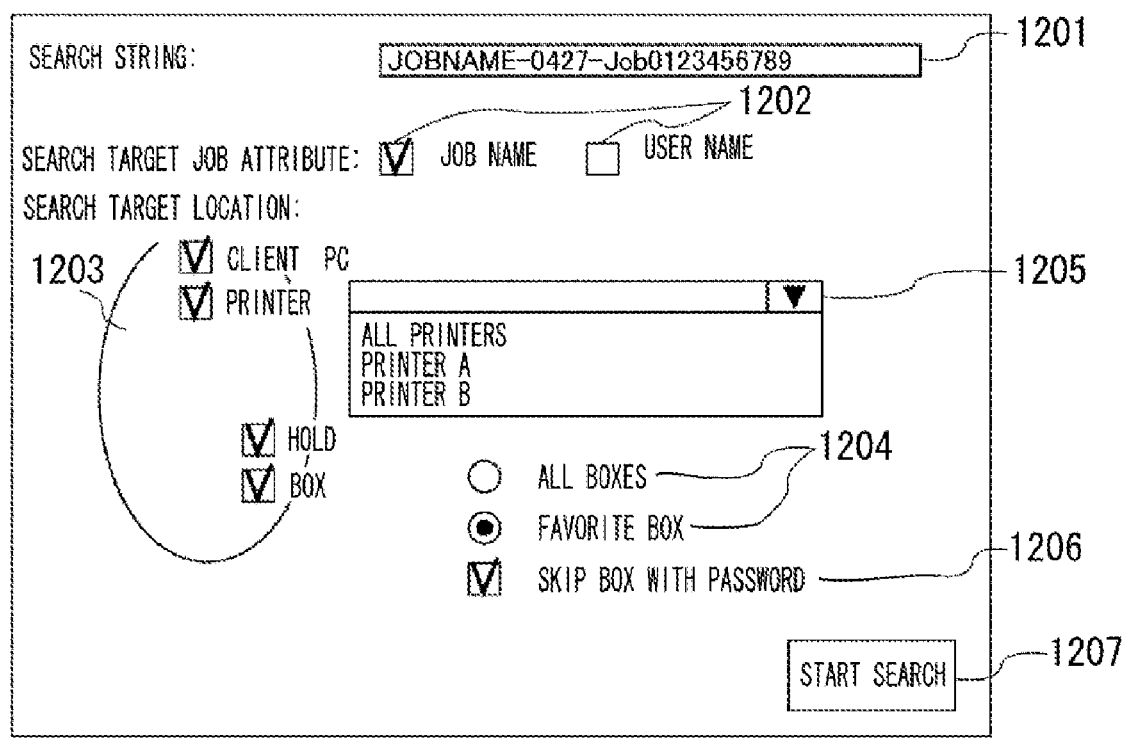
FIG. 12 illustrates a screen on a user interface (UI) for designating a retrieval condition according to the first exemplary embodiment of the present invention.

In the retrieval condition designating UI illustrated in FIG. 12, a user enters "JOBNAME-0427-Job0123456789" as the search string, and selects "job name" (902) as the search target job attribute. Moreover, the user selects "client PC", and "hold (printer)" and "box (printer)" in "All printers" as the search target location.

In step S1102, the job retrieval unit 15 initializes a list of retrieval results to be supplied to the display control unit 11.

In the loop starting with step S1103 to step S1106, the job retrieval unit 15 extracts job management data 702 that matches the retrieval condition from a list of job management data 702 stored in the search target location designated in step S1101. The job retrieval unit 15 then sequentially adds the list of the extracted job management data 702 to the list of retrieval results, which is initialized in step S1102.

In step S1104, the job retrieval unit 15 extracts job management data 702 that matches the retrieval condition from the list of job management data 702 stored in the search target location.

In step S1105, the job retrieval unit 15 adds the list of the job management data 702 extracted in step S1104 (illustrated in FIG. 14) to the list of retrieval results. The job retrieval unit 15 then records the job storage locations where the extracted job management data 702 is stored, in "location" 904 in the list of retrieval results illustrated in FIG. 15. The job retrieval unit 15 records "client PC" in "location" 904 if the print job is stored in the job storage unit 13, and "hold-[printer name]" if the job is stored in the hold job storage unit 2501 of the network printer 102. Moreover, the job retrieval unit 15 records "box [box number]-[printer name]" in "location" 904 if the job is a print job stored in the box job storage unit 2502 of the network printer 102.

After the job extraction process in step S1104 is performed for all search target locations, the process proceeds to step S1107. In step S1107, the job retrieval unit 15 supplies the list of retrieval results (illustrated in FIG. 15) to the display control unit 11. The display control unit 11 then displays the received list of retrieval results on the display unit (i.e., display 207 in FIG. 2).

FIG. 12 illustrates an example of a UI for a user to designate a retrieval condition when retrieving a print job. The method for designating a retrieval condition will be described below with reference to FIG. 12.

The user enters a search string as a first retrieval condition in an edit box 1201. Additionally, the user designates either "job name" or "user name" in the search target job attribute 1202 as a second retrieval condition. Furthermore, the user selects a search target location from among "client PC", "printer", "hold" in a printer, and "box" in a printer in the search target locations 1203 as a third retrieval condition. The user can input various retrieval conditions via the UI in FIG. 12. Consequently, the user can easily find the desired print job.

If the user selects "client PC" as a search target location, the job retrieval unit 15 searches print jobs that are stored in the job storage unit 13 in the network computer 101.

On the other hand, if the user selects "printer" as a search target location, the user can designate a job storage unit on a specific printer. In addition, the user can designate, via a selection box 1205, job storage units 25 of all printers that are managed by the job management unit 14 in the network computer 101, as a search target location. Moreover, when the user selects "printer", at least one of "box" and "hold" can be selected.

In a case where the user selects "hold" from among the search target locations 1203, the print jobs stored in the hold job storage unit 2501 in the job storage unit 25 of the printer 102 or 103 are designated as a search target.

On the contrary, in a case where the user selects "box" 1204, either "all boxes" or "favorite box" in the box job storage unit 2502 is selected. A user can register one or more boxes as a favorite box. If the user selects "favorite box", only a specific job information management memory 251 (or box) that a user has registered as a favorite box is designated from among the boxes in the box job storage unit 2502. The user can precisely designate a search target location by designating only the favorite box as a search target location, rather than designating all boxes in the box job storage unit 2502. As a result, the total number of print jobs that are search targets can be reduced, and the efficiency of the retrieval process can be improved.

Moreover, if the user selects "skip box with password" 1206, only boxes without a password setting are designated as search target locations. A user can register one or more boxes as a skip box. To be more specific, the job retrieval unit 15 obtains box attribute information on whether a password is set on each box from the box job storage unit 2502 in the network printer 102. When the box job storage unit 2502 sends box attribute information that indicates no password setting, the job retrieval unit 15 obtains the job management data 702 stored in the corresponding box and performs the job extraction process in step S1104 in FIG. 11. If the box job storage unit 2502 sends box attribute information that indicates a password setting, the job retrieval unit 15 does not perform the job extraction process in step S1104. The above-described process is repeated for each box when the user designates a plurality of boxes.

Figure 13:
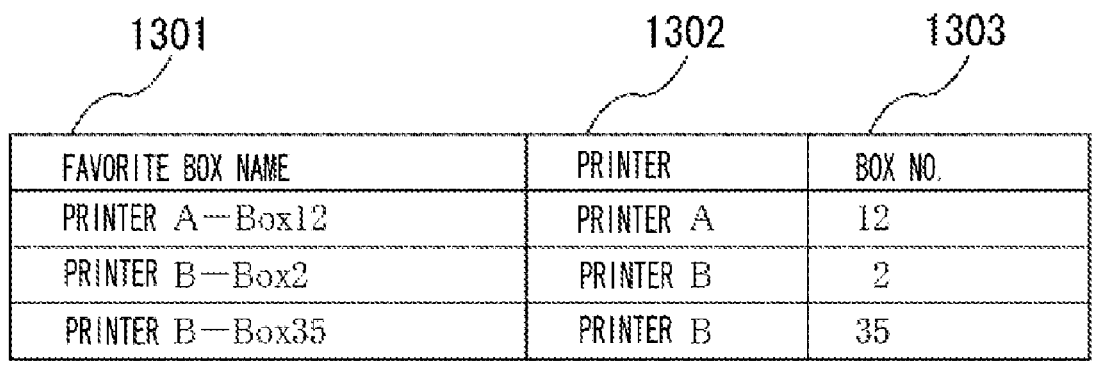
FIG. 13 illustrates an example of a list of favorite boxes, in which a user registers a specific box as a favorite box, according to the first exemplary embodiment of the present invention.

FIG. 13 illustrates an example of a favorite box list. The favorite box list is stored in the job management unit 14. A specific job information management memory 251 (box), or a favorite box, in the box job storage unit 2502 of each printer is registered in the favorite box list. A user can register a favorite box by designating a desired box from among a plurality of boxes on a setting screen (not illustrated).

When retrieving a print job, a user can designate only the favorite boxes from the boxes in the box job storage unit 2502 as the search target location. In the favorite box list, "favorite box name" 1301, "printer" 1302, and "box number" 1303 are recorded. The "favorite box name" 1301 lists names of boxes that are arbitrarily defined by a user. Therefore, the job management unit 14 identifies a box registered in the favorite box list based on the "printer" 1302 and the "box number" 1303.

In the example of FIG. 13, box No. 12 of printer A and boxes No. 2 and No. 35 of printer B are registered as favorite boxes. As illustrated in FIG. 13, a user can pre-register one or more boxes of a printer that the user desires as favorite boxes.

As described above, in the present exemplary embodiment, a user can designate favorite boxes via the UI illustrated in FIG. 12 as search target locations of a print job. As a result, usability is greatly improved as compared to when a user designates all boxes in the printer as search target locations.

Figure 11:
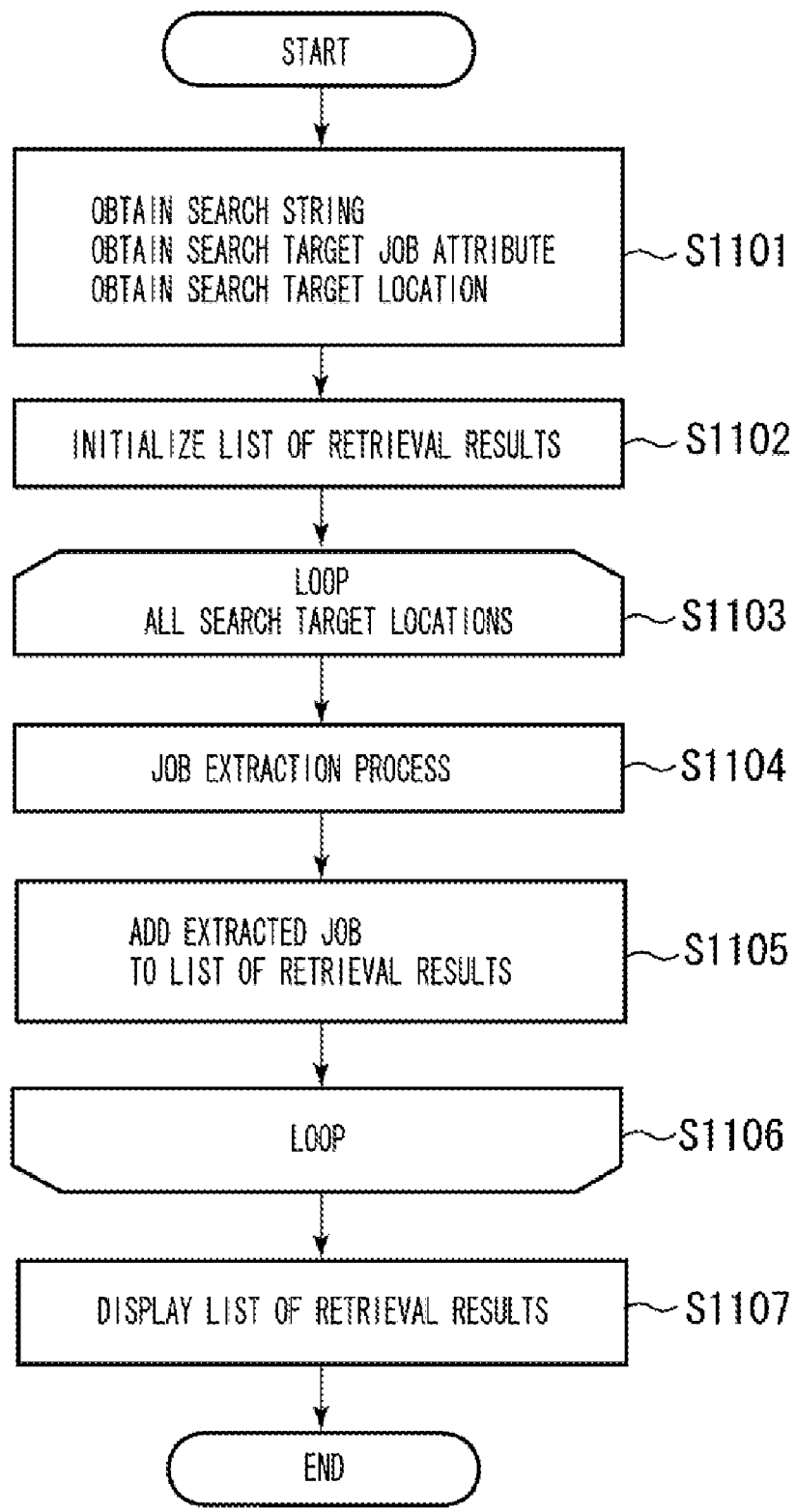
FIG. 11 is a flowchart illustrating a process according to a first exemplary embodiment of the present invention.
Figure 14:
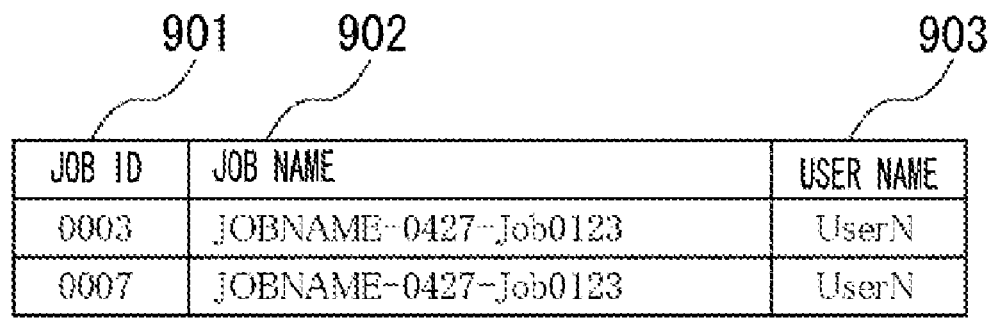
FIG. 14 illustrates an example of a job extraction list which includes jobs whose job names match a search string and which are extracted from the job management data illustrated in FIG. 9 according to the first exemplary embodiment of the present invention.

In the job extraction process of step S1104 in the flowchart illustrated in FIG. 11, the job retrieval unit 15 obtains job management data 702 from the search target location. The job retrieval unit 15 then changes the comparative number of characters, i.e., number of characters in the search string to be compared with a character string of a search target job attribute. The process of changing the comparative number of characters will be described in detail in step S1604 in FIG. 16. The job retrieval unit 15 then extracts print jobs that match the retrieval condition. FIG. 14 illustrates a list of print jobs extracted by the job retrieval unit 15 in the above-described process.

As illustrated in FIG. 14, print jobs that are listed in the job management data 702 are narrowed down to print jobs whose job name (as listed in "job name" 902) includes a search string "JOBNAME-0427-Job0123".

The job retrieval unit 15 merges the list of retrieval results obtained in step S1105 with other lists of retrieval results, and adds "location" 904 as a job attribute to the merged list, as illustrated in FIG. 15. The list illustrated in FIG. 15 is a list of retrieval results obtained in a case where the job storage unit 13 in the network computer 101 and the hold job storage unit 2501 and the box job storage unit 2502 in the network printers 102 and 103 are designated as the search target locations.

In a case where the length limit illustrated in FIG. 10 is applied to the present retrieval condition, the search string "JOBNAME-0427-Job0123456789", which was entered by a user via the UI illustrated in FIG. 12 exceeds the length limit. Therefore, the job retrieval unit 15 adapts the comparative number of characters to the job name length limit 1002 in FIG. 10 of each job storage unit. This is implemented by performing the process of changing the comparative number of characters in step S1604 illustrated in FIG. 16.

To be more specific, the job retrieval unit 15 adapts the search string to 32 bytes in the job storage unit 13 in the network computer 101, to 20 bytes in the hold job storage unit 2501 in the printer A or B, and to 24 bytes in the box job storage unit 2502. The job retrieval unit 15 thus performs the job extraction process in step S1104 using the above-described comparative number of characters. The example illustrated in FIG. 15 is a list of retrieval results obtained when the job retrieval unit 15 has performed the job extraction process in step S1104 on all search target locations.

The job extraction process in step S1104 will be described in detail below with reference to a flowchart illustrated in FIG. 16. The job retrieval unit 15 performs the job extraction process in step S1104 for every search target location designated in step S1103.

In step S1601, the job retrieval unit 15 obtains a list of job management data 702 from a job storage unit. In a case where the job retrieval unit 15 obtains a list of job management data 702 from the job storage unit 13, the job retrieval unit 15 sends a job information obtaining request to the job storage unit 13. On the other hand, if the job retrieval unit 15 obtains a list of job management data 702 from the job storage unit 25 in the network printer 102, the job retrieval unit 15 sends a job management data obtaining command to the job storage unit 25 via the data transmission management unit 16 and the data reception management unit 21. Upon receiving the job management data obtaining command, the job storage unit 25 sends a list of job management data 702 to the job retrieval unit 15 via the data transmission management unit 29 and the data reception management unit 17.

In step S1602, the job retrieval unit 15 initializes a list of retrieval results.

In the loop starting with step S1603 to S1610, the job retrieval unit 15 performs job extraction from the list of job management data 702 obtained in step S1601 based on all search target job attributes.

In step S1604, the job retrieval unit 15 changes the comparative number of characters, which is to be used in a job attribute comparison process in step S1606. The process of changing the comparative number of characters in step S1604 will be described in detail below.

In the loop starting with step S1605 to step S1609, the job retrieval unit 15 extracts jobs that match the retrieval condition from the job management data 702 obtained in step S1601.

In step S1606, the job retrieval unit 15 compares a character string of a search target job attribute with the search string. In comparing the character string with the search string, the job retrieval unit 15 uses the comparative number of characters, which was changed by performing the process of changing the comparative number of characters. The job attribute comparison process in step S1606 will be described in detail below.

In step S1607, the job retrieval unit 15 determines whether a print job matches the retrieval condition based on the result of the job attribute comparison process in step S1606. If the print job matches the retrieval condition (YES in step S1607), the process proceeds to step S1608. On the other hand, if the print job does not match the retrieval condition (NO in step S1607), the process proceeds to step S1609.

In step S1608, the job retrieval unit 15 adds the print job that matches the retrieval condition to the list of retrieval results initialized in step S1602.

After the job retrieval unit 15 compares all of the job management data 702 included in the list of job management data 702 obtained in step S1601 with the search string, the process proceeds to step S1609. The job retrieval unit 15 then ends the print job extraction based on the present search target job attribute. The job retrieval unit 15 ends the job extraction process in step S1104 after the job attribute comparison result is performed for all of the search target job attributes.

The process of changing the comparative number of characters in step S1604 will be described in detail below with reference to a flowchart illustrated in FIG. 17. The process of the flowchart illustrated in FIG. 17 is performed based on the loop in step S1103 in FIG. 11 and step S1603 in FIG. 16, and the list of length limit data illustrated in FIG. 10 for every storage area of a print job and every attribute of a job (i.e., job name and user name), which a user designates via the UI illustrated in FIG. 12.

In step S1701, the job retrieval unit 15 identifies the length limit of a search target job attribute corresponding to the type of search target location from the length limit data 701 in the job management unit 14.

In step S1702, the job retrieval unit 15 determines whether the length of the search string exceeds the length limit obtained in step S1701. If the length of the search string exceeds the length limit (YES in step S1702), the process proceeds to step S1703. On the other hand, if the length of the search string does not exceed the length limit (NO in step S1702), the process of changing the comparative number of characters in step S1604 of FIG. 16 ends.

In step S1703, the job retrieval unit 15 sets (processes) the comparative number of characters to at least less than or equal to the length limit specified in step S1701. In the present exemplary embodiment, the job retrieval unit 15 sets the comparative number of characters to 24 bytes. Therefore, the search string is processed to be smaller than or equal to 24 bytes.

In step S1704, the job retrieval unit 15 determines whether a broken number of bytes of a multi-byte character is present at the end of the search string when the search string is separated according to the comparative number of characters. A multi-byte character is a character that expresses one character using two bytes or more.

If the character at the end of the search string is a multi-byte character and does not fit into the comparative number of characters (YES in step S1704), the process proceeds to step S1705. On the contrary, if the character at the end of the search string fits into the comparative number of characters (NO in step S1704), the process of changing the comparative number of characters in step S1604 of FIG. 16 ends.

In the present exemplary embodiment, if a search string "JOBNAME-0427-Job0123456789" is separated according to a comparative number of characters of 24 bytes, the search string becomes "JOBNAME-0427-Job01234567". In such a case, the character at the end of the search string fits into the comparative number of characters. However, if a search string is "JOBNAME-0427-□□□□□0123456789" (where "□" denotes a two-byte character), "JOBNAME-0427-□□□□□" corresponds to 23 bytes. Therefore, if the search string is separated according to a comparative number of characters of 24 bytes, one byte of the last two-byte character "□" does not fit into the comparative number of characters.

Figure 16:
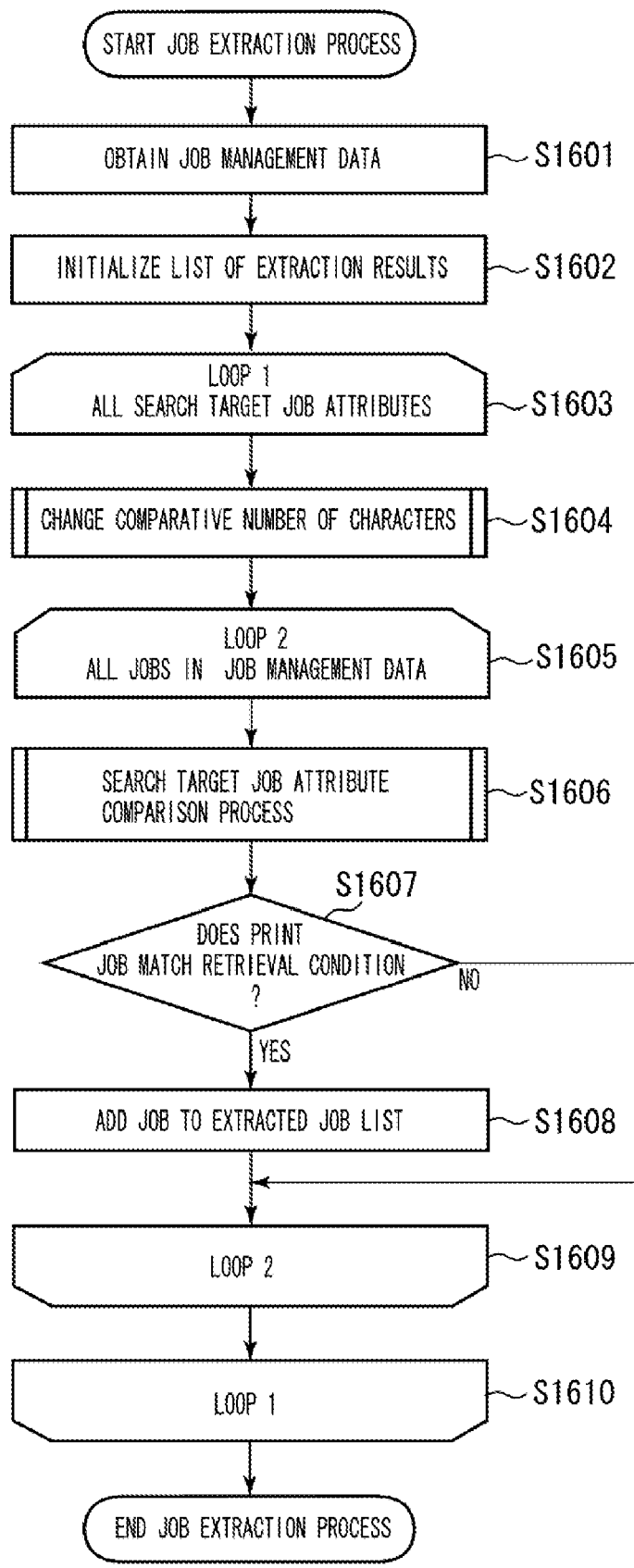
FIG. 16 is a flowchart illustrating a job extraction process illustrated in FIG. 11 according to the first exemplary embodiment of the present invention.
Figure 17:
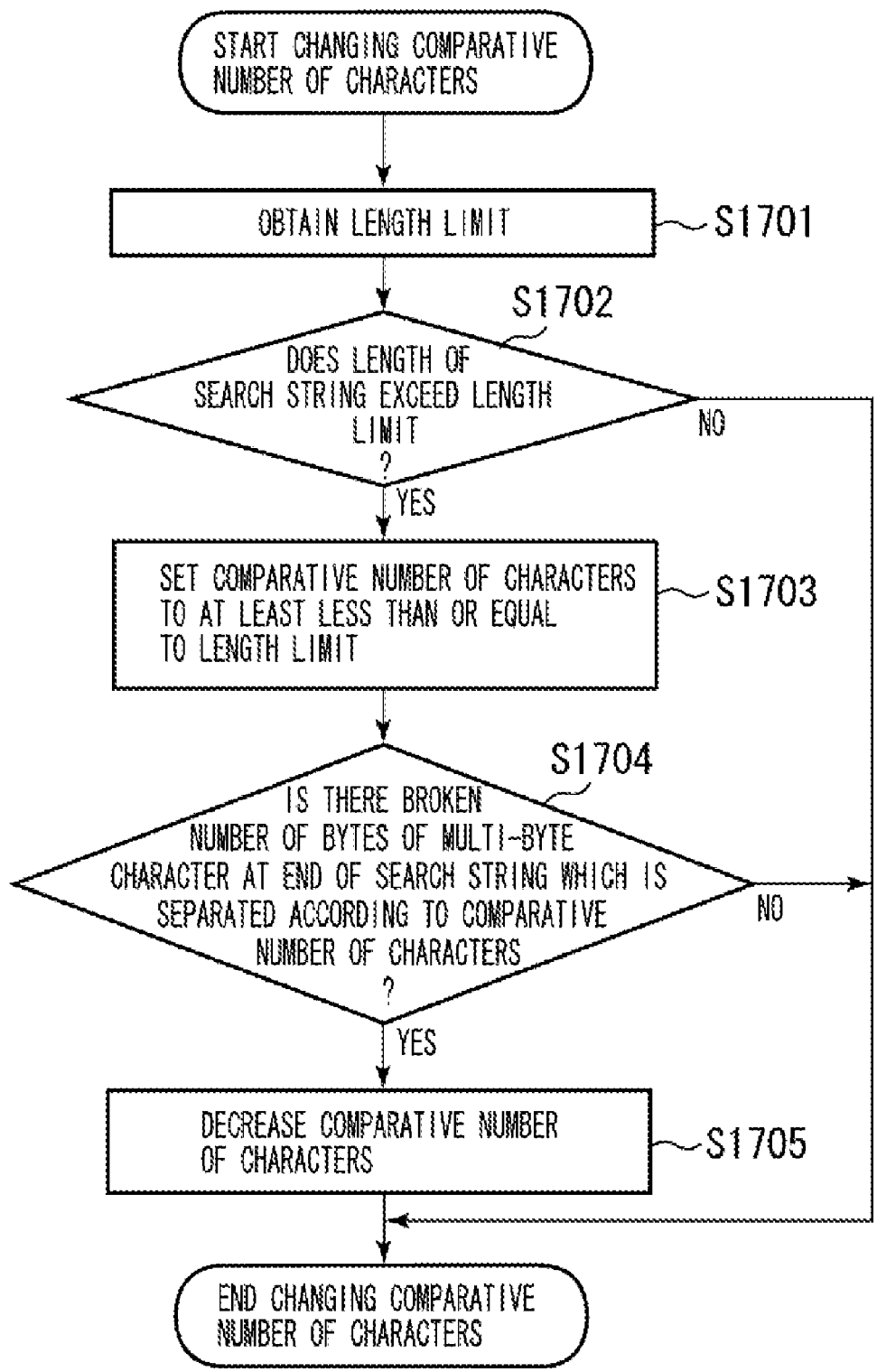
FIG. 17 is a flowchart illustrating a process of changing comparative number of characters illustrated in the flowchart of FIG. 16 according to the first exemplary embodiment of the present invention.

In step S1705, the job retrieval unit 15 decreases the comparative number of characters and ends the process of changing the comparative number of characters in step S1604 of FIG. 16. In a case where the search string is "JOBNAME-0427-□□□□□0123456789", the comparative number of characters is set to 23 bytes, which is one byte less than 24 bytes.

The job attribute comparison process in step S1606 will be described in detail below with reference to a flowchart illustrated in FIG. 18. In the same way as FIG. 17, the process of the flowchart illustrated in FIG. 18 is performed for every storage area of print jobs and for every attribute of a print job (i.e., job name and user name), which a user designates via the UI illustrated in FIG. 12.

In step S1801, the job retrieval unit 15 obtains a character string of a search target job attribute from the job management data 702.

In step S1802, the job retrieval unit 15 compares a character string of a search target job attribute obtained in step S1801 with the search string, starting with the head of the character string up to the end of the comparative number of characters. The comparative number of characters that was changed by the process of changing the comparative number of characters in step S1604 of FIG. 16 is used in the comparison process.

Figure 18:
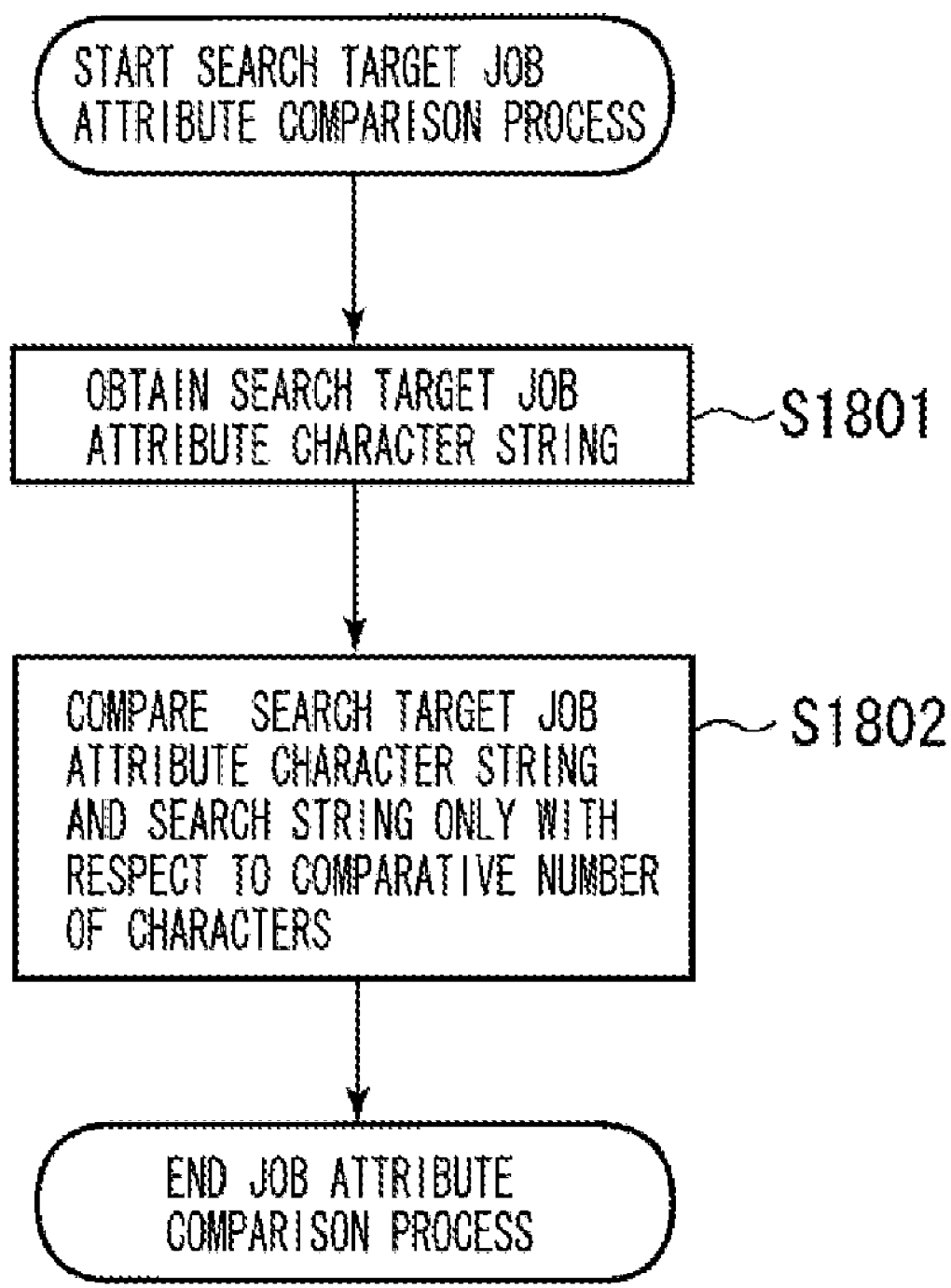
FIG. 18 is a flowchart illustrating a search target job attribute comparison process illustrated in the flowchart of FIG. 16 according to the first exemplary embodiment of the present invention.

As described above, a retrieval condition input by a user via the UI in FIG. 12 can be processed by performing the process of the flowcharts illustrated in FIGS. 17 and 18. The retrieval condition is processed based on a type of designated storage area and length limit data corresponding to the type of designated storage area (i.e., characteristic of the storage area). As a result, a user can obtain a reliable retrieval result when retrieving a print job from various locations.

The present invention can be applied to retrieval from a plurality of job storage units in the same printer. That is, retrieval can be performed using a comparative number of characters which is adjusted to the length limit of each of the different job storage units 25, or the hold job storage unit 2501 and box job storage unit 2502, in the same printer.

According to the first exemplary embodiment, the job retrieval unit 15 performs a job extraction process of step S1104 illustrated in FIG. 11. The job retrieval unit 15 thus extracts from the job management data 702 of each job storage unit a print job that matches the retrieval condition. In the job extraction process in step S1104, the job retrieval unit 15 performs the process of changing the comparative number of characters in step S1604 of FIG. 16. Consequently, the job retrieval unit 15 changes the comparative number of characters for each job attribute stored in each job storage unit. When changing the comparative number of characters, the retrieval unit 15 identifies the length limit of each of the job attributes stored in each job storage unit from the length limit data 701.

By performing the above-described process, the retrieval condition is changed according to each job attribute of each job storage unit. As a result, print jobs stored in various job storage locations as illustrated in FIG. 15 can be retrieved. According to the present exemplary embodiment, a print job whose character string corresponding to the search target job attribute is shortened by a limit set by the job storage location can be included in the retrieval result. Moreover, according to the first exemplary embodiment, a job stored in a job storage location whose length limit is shorter than the length of the search string is not included in the retrieval result.

A case where a print job is retrieved using a conventional method will be described below to illustrate the effectiveness of the present exemplary embodiment.

The example of the length limit data 701 in FIG. 10 will be used to describe such a case. Consequently, the "job name length limit" 1002 of the job storage unit 13 in the network computer 101 is 32 bytes. Additionally, the "job name length limit" 1003 of the box job storage unit 2502 in the network printer 102 is 24 bytes. Moreover, the search target job attribute is "job name" 902, and the search string is "JOBNAME-0427-Job0123456789" (26 bytes).

When a print job is retrieved based on the above conditions, the job management data 702 stored in the job storage unit 13 in the network computer 101 whose "job name" 902 is "JOBNAME-0427-Job0123456789" (26 bytes) is included in the retrieval result from the list of job management data 702. However, the "job name length limit" 1002 of the job management data 702 stored in the box job storage unit 2502 of the network printer 102 is 24 bytes. Therefore, a job management data 702 whose "job name" 902 is "JOBNAME-0427-Job0123456789" (26 bytes) does not exist in the list of job management data 702 stored in the box job storage unit 2502 of the network computer 102. That is, the case where the "job name length limit" 1002 of the job storage unit 13 is shorter than the length of the search string is comparable with the case where the job storage unit 13 is not designated as a search target location.

A user can perform print job retrieval to search for a print job that is stored from the network computer 101 into the network printer 102. In such a case, the job management data 702 stored in the box job storage unit 2502 of the network printer 102 and whose "job name" 902 is "JOBNAME-0427-Job01234567" (24 bytes, i.e., the length limit of the network printer 102) should be included in the retrieval result. That is, it is desirable that a job retrieval method includes, in the retrieval result, the job management data 702 whose character string matches the search string up to the length limit of the search target job attribute.

As described above, a user can retrieve a desired job from a plurality of job storage locations according to an exemplary embodiment of the present invention.

Second Exemplary Embodiment

In the first exemplary embodiment, the comparative number of characters of each search target job attribute in each retrieval job storage unit is changed. However, the present invention is not limited to changing a designated retrieval condition according to each job storage unit and each job attribute on a case-by-case basis. A second exemplary embodiment capable of realizing print job retrieval will be described below.

In the present exemplary embodiment, when starting retrieval, the job retrieval unit 15 truncates the search string to match the minimum length limit. Therefore, the present exemplary embodiment changes the retrieval condition such that the same retrieval condition can be used for all job storage units and all job attributes.

The retrieval result that can be achieved in the second exemplary embodiment includes all print jobs included in the retrieval result of the first exemplary embodiment. However, since the search string is truncated to match the minimum length limit, print jobs that are not included in the retrieval result of the first exemplary embodiment are included in the retrieval result obtained in the second exemplary embodiment.

For example, in the first exemplary embodiment, the search string is "JOBNAME-0427-□□□□□□0123456789", where "□" denotes a two-byte character. If this search string is truncated to 20 bytes, the search string becomes "JOBNAME-0427-□□□□□□0123". As a result, a print job whose job name is "JOBNAME-0427-□□□□□□01235567", which is not included in the retrieval result obtained in the first exemplary embodiment, is included in the retrieval result obtained in the second exemplary embodiment.

Figure 19:
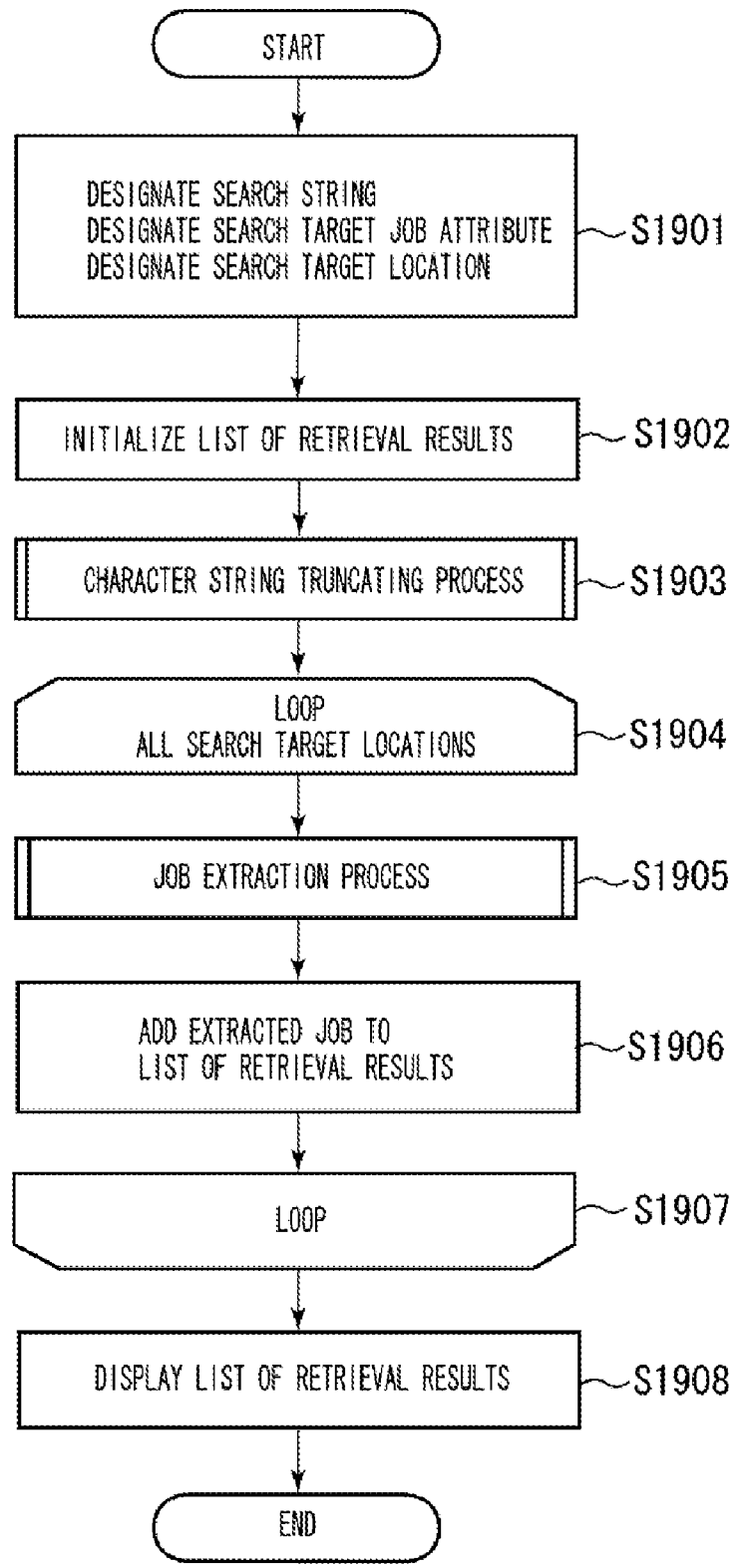
FIG. 19 is a flowchart illustrating a process according to a second exemplary embodiment of the present invention.

FIG. 19 is a flowchart illustrating the process (steps S1901 to S1908) according to the second exemplary embodiment, which is similar to the flowchart in FIG. 11. In the present exemplary embodiment, the job retrieval unit 15 truncates the search string to match the length limit of all search target job attributes of all search target locations. The job retrieval unit 15 performs the above-described character string truncating process in step S1903 before performing the job extraction process in step S1905 for all search target locations. In the first exemplary embodiment, the job retrieval unit 15 does not perform such a process in step S1903. The process in step S1903 in the present exemplary embodiment will be described in detail below with reference to FIG. 20.

Moreover, the job extraction processes performed in step S1905 in the flowchart of FIG. 19 and in step S1104 in the flowchart of FIG. 11 are slightly different. The job extraction process in step S1905 will also be described in detail below.

Other processes (steps S1901, S1902, S1904, S1906, S1907, and S908) in the second exemplary embodiment are similar to the first exemplary embodiment.

Figure 20:
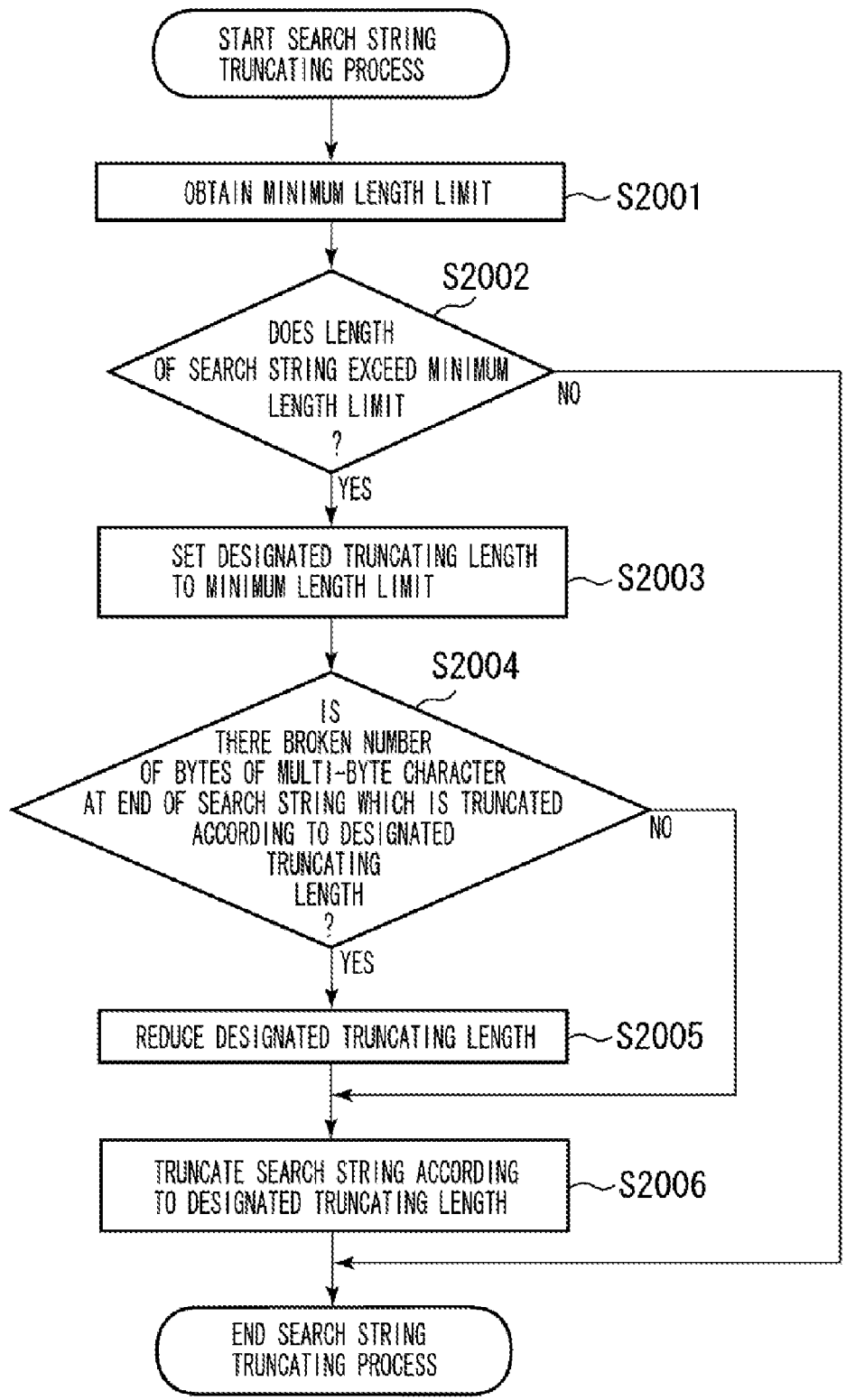
FIG. 20 is a flowchart illustrating a search string truncating process illustrated in the flowchart of FIG. 19 according to the second exemplary embodiment of the present invention.

The character string truncating process in step S1903 will be described in detail with reference to a flowchart illustrated in FIG. 20. The flowchart illustrated in FIG. 20 processes a retrieval condition input by a user via the UI illustrated in FIG. 12. The processing is based on a type of storage area that a user designates, and the length limit data corresponding to the type of designated storage area (i.e., a characteristic of the storage area). As a result, the user can obtain a reliable retrieval result when performing print job retrieval in various locations.

In step S2001, the job retrieval unit 15 references the length limit data 701 stored in the job management unit 14 in the network computer 101. The job retrieval unit 15 then obtains the minimum value of the length limit of all search target job attributes in all search target locations. The minimum value obtained in step S2001 is a minimum value of length limit data corresponding to one or more storage areas of a print job that a user designates using the UI illustrated in FIG. 12. The job retrieval unit 15 obtains a minimum value for each job attribute.

In step S2002, the job retrieval unit 15 determines whether the length of the search string exceeds the minimum length limit obtained in step S2001. If the length of the search string exceeds the minimum length limit (YES in step S2002), the process proceeds to step S2003. On the other hand, if the length of the search string does not exceed the minimum length limit (NO in step S2002), the character string truncating process in step S1903 illustrated in FIG. 19 ends.

In step S2003, the job retrieval unit 15 sets the minimum length limit as the designated truncating length. That is, the search string is cut at the designated truncating length from the head of the string.

In step S2004, the job retrieval unit 15 determines whether a broken number of bytes of a multi-byte character is present at the end of the character string which is truncated according to the designated truncating length. If the character at the end of the character string does not fit into the designated truncating length (YES in step S2004), the process proceeds to step S2005. In step S2005, the job retrieval unit 15 reduces the designated truncating length by the broken number of bytes of character at the end of the character string. On the contrary, if the character at the end of the character string fits into the designated truncating length (NO in step S2004), the process proceeds to step S2006.

For example, in a case where the search string in the present exemplary embodiment is "JOBNAME-0427-Job0123456789", and the search string is cut at 20 bytes, the search string becomes "JOBNAME-0427-Job0123". In such a case, the character at the end of the character string fits into the designated truncating length. However, if the search string is "JOBNAME-0427-□□□□□□0123456789" (where "□" denotes a two-byte character), "JOBNAME-0427-□□□" corresponds to 19 bytes. Therefore, if the above search string is cut at 20 bytes, one byte of the last two-byte character "□" does not fit into the designated truncating length.

In step S2006, the job retrieval unit 15 truncates the search string at the designated truncating length, and then ends the process of step S1903 in the flowchart of FIG. 19.

Figure 21:
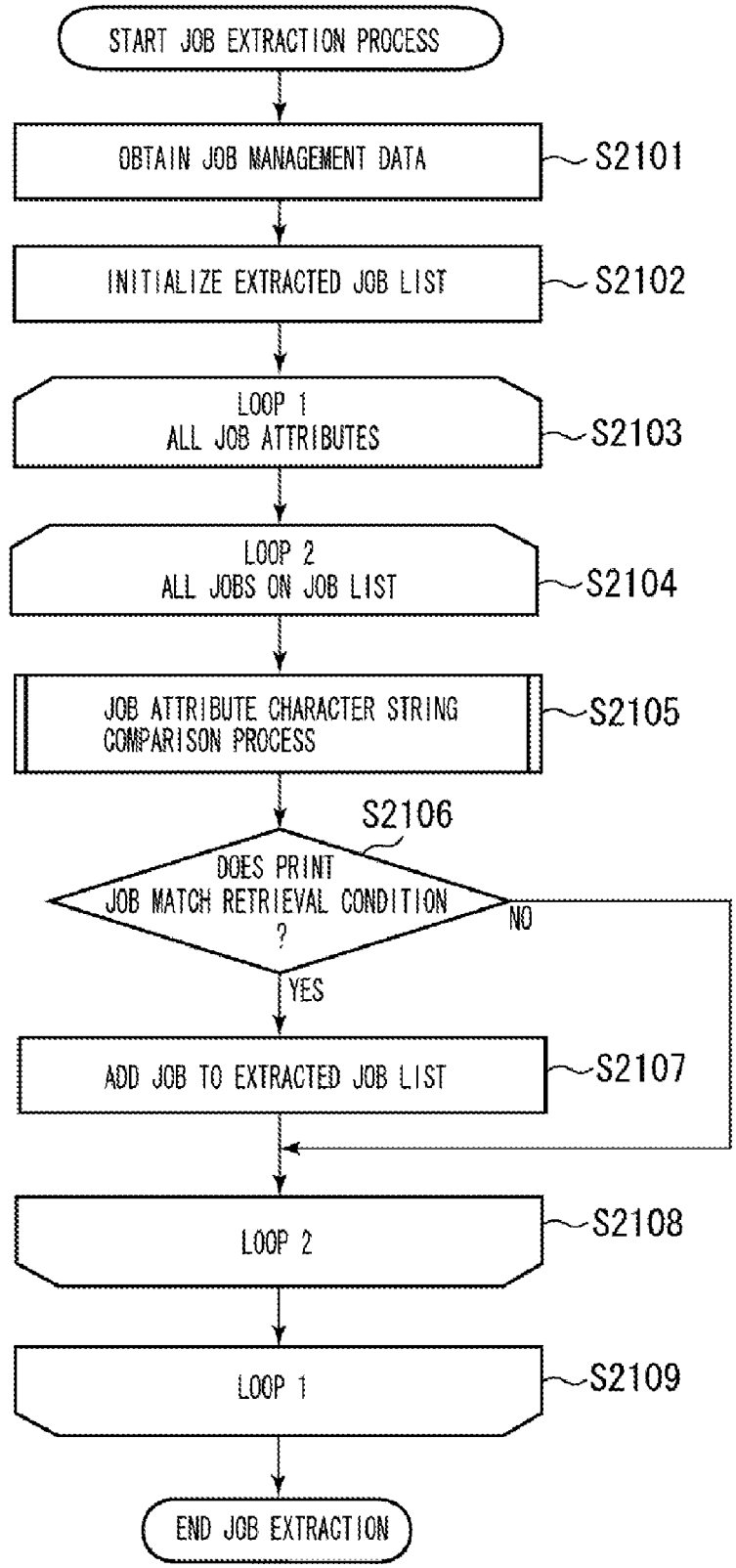
FIG. 21 is a flowchart illustrating a job extraction process illustrated in the flowchart of FIG. 19 according to the second exemplary embodiment of the present invention.

The job extraction process of step S1905 will be described in detail below with reference to a flowchart illustrated in FIG. 21. In FIG. 21, loop 1 in steps S2103 to S2109 corresponds to the loop in steps S1603 to S1610 in the flowchart of FIG. 16, and loop 2 in steps S2104 to S2108 corresponds to the loop in steps S1605 to S1609 in the flowchart of FIG. 16. In the second exemplary embodiment, the job retrieval unit 15 does not change the comparative number of characters, unlike the job extraction process of step S1104 in FIG. 16 of the first exemplary embodiment. Since the search string is truncated according to the above-described character string truncating process in step S1903, the search target job attribute and the search string can be compared without considering the comparative number of characters.

Figure 22:
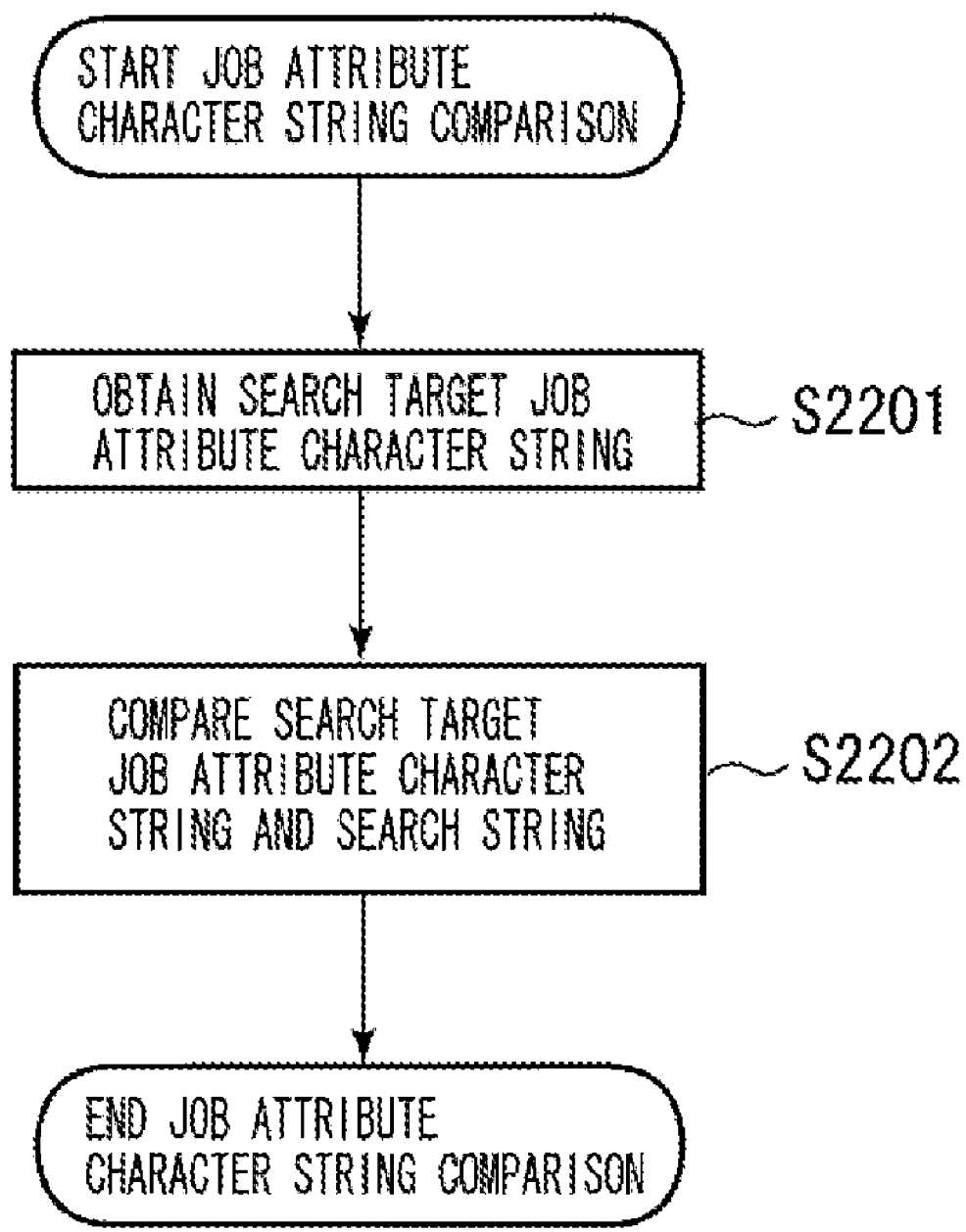
FIG. 22 is a flowchart illustrating a search target job attribute comparison process illustrated in the flowchart of FIG. 21 according to the second exemplary embodiment of the present invention.

Moreover, the job attribute comparison process in step S2105 according to the second exemplary embodiment is different from the job attribute comparison process in step S1606 illustrated in FIG. 16 according to the first exemplary embodiment. The job attribute comparison process in step S2105 according to the second exemplary embodiment will be described in detail with reference to the flowchart of FIG. 22.

In step S2201, the job retrieval unit 15 obtains a character string of a search target job attribute from the job management data 702. In step S2202, the job retrieval unit 15 compares the character string of the search target job attribute obtained in step S2201 with the search string. In the second exemplary embodiment, the retrieval unit 15 determines whether the search string that was truncated by the character string truncating process in step S1903 illustrated in FIG. 19 is completely included in the character string of the search target job attribute. On the contrary, in the first exemplary embodiment, the retrieval unit 15 compares the search target job attribute with the search string only by the comparative number of characters that was changed by the process of changing the comparative number of characters in step S1604.

Third Exemplary Embodiment

In the first and second exemplary embodiments, the job management unit 14 in the network computer 101 stores the length limit data 701. In addition, the job retrieval unit 15 in the network computer 101 extracts a job from the job management data 702 obtained from each job storage unit. In a third exemplary embodiment, each job storage unit stores the length limit data 701, so that each storage unit receives the retrieval condition and performs job extraction.

Figure 23:
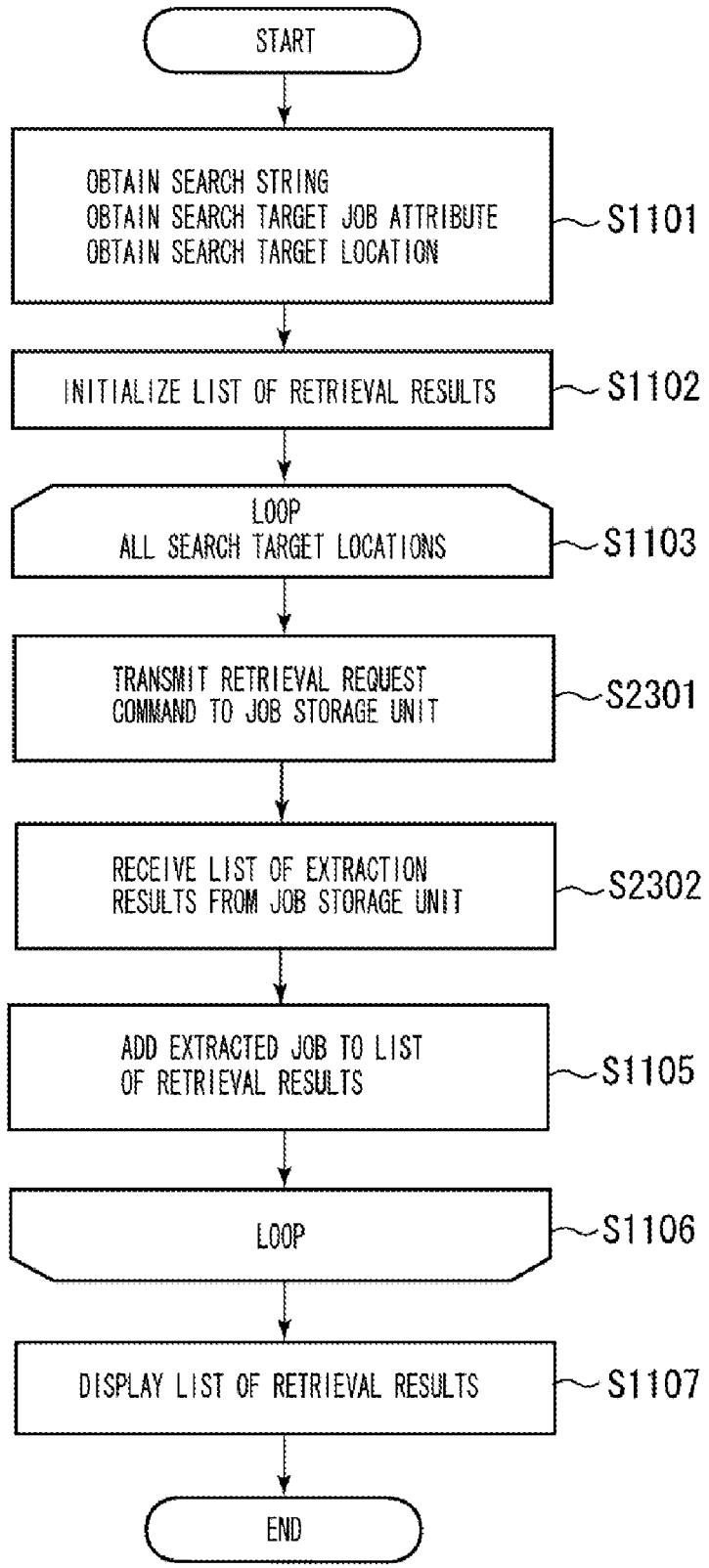
FIG. 23 is a flowchart illustrating a process according to a third exemplary embodiment of the present invention, which is a modification of the first exemplary embodiment.

Job retrieval according to the third exemplary embodiment, which is a modification of the first exemplary embodiment, will be described below with reference to a flowchart illustrated in FIG. 23. The flowchart of FIG. 23 illustrates a process that is similar to the process illustrated in the flowchart of FIG. 11.

Differences in the flowchart of FIG. 23 from the flowchart of FIG. 11 are as follows. In step S2301 in FIG. 23, the job retrieval unit 15 sends a job retrieval request command including a retrieval condition to a job storage unit that manages a retrieval job storage location. The job storage unit of each printer that receives the job retrieval request command performs a job extraction process similar to the process in step S1104. The job storage unit then sends a list of job extraction results to the job retrieval unit 15 at the client side.

In step S2302, the job retrieval unit 15 receives the list of job extraction results from the job storage unit.

In step S1105, the job retrieval unit 15 adds to the list of retrieval results the list of job extraction result (i.e., the result of the process of step S1104), which was sent from the job storage unit.

Since the job storage unit performs the job extraction process of step S1104 in the flowchart of FIG. 16, the job retrieval unit 15 does not need to perform the job management data obtaining process in step S1601. Moreover, the job retrieval unit 15 does not need to perform the length limit data obtaining process in step S1701 in the process of changing the comparative number of characters in step S1604 in the flowchart of FIG. 17. Other processes are similar to the first exemplary embodiment.

Job retrieval according to the third exemplary embodiment, which is a modification of the first exemplary embodiment, can obtain similar retrieval results as the first exemplary embodiment. Furthermore, since each job storage unit extracts a job, the extraction process is distributed and the entire processing speed is improved. Moreover, in the first exemplary embodiment, the list of all job management data 702 stored in each job storage unit is sent to the job retrieval unit 15. However, in the third exemplary embodiment, the list of results of extracting job management data 702 that matches the retrieval condition is sent to the job retrieval unit 15. As a result, the data communication between the network computer 101 and the network printer 102 or 103 can be decreased.

Figure 24:
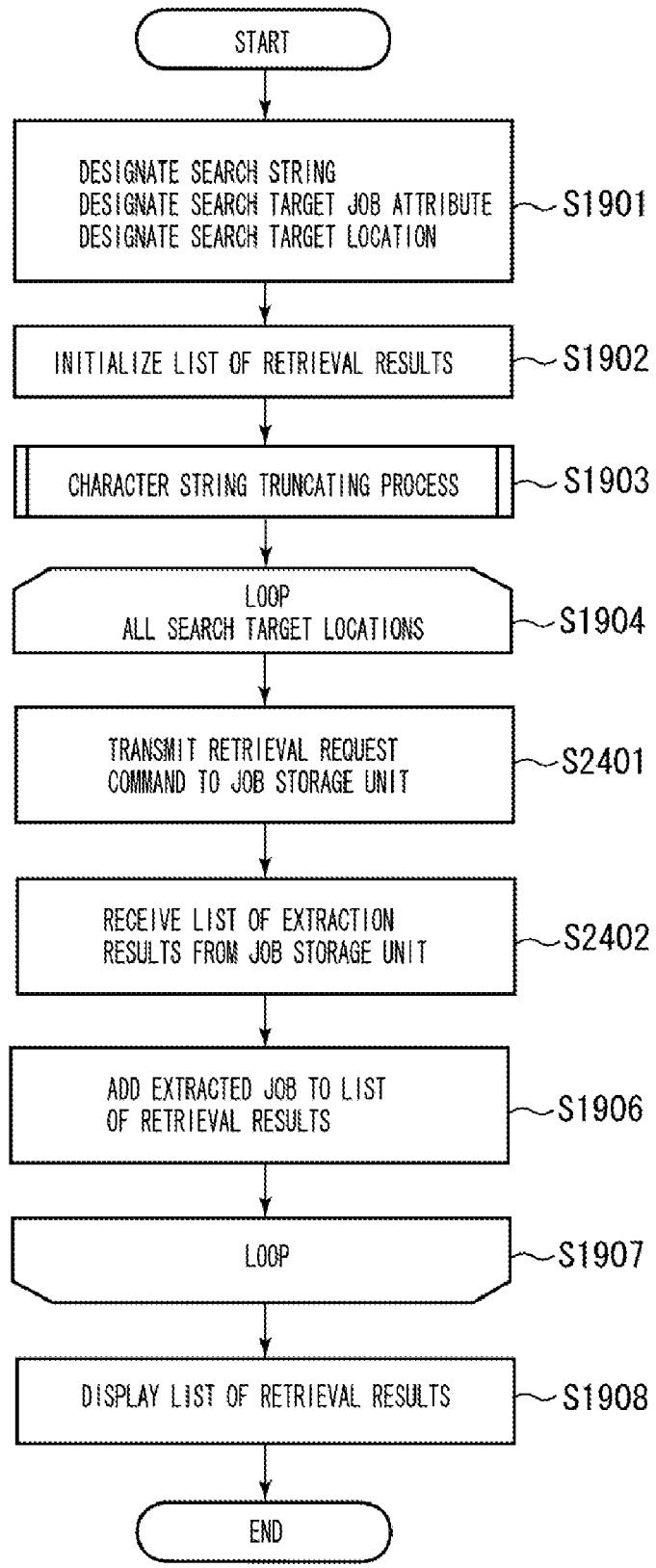
FIG. 24 is a flowchart illustrating a process according to the third exemplary embodiment of the present invention, which is a modification of the second exemplary embodiment.

Job retrieval according to the third exemplary embodiment, as a modification of the second exemplary embodiment, will be described below with reference to a flowchart illustrated in FIG. 24. The process in the flowchart of FIG. 24 is similar to the process in the flowchart of FIG. 19. The difference is that, in step S2401, the job retrieval unit 15 sends a job retrieval request command including a retrieval condition to a job storage unit that manages a retrieval job storage location. The job storage unit, which receives the job retrieval request command, performs the job extraction process of step S1905 and sends the list of extraction results to the job retrieval unit 15. In step S2402, the job retrieval unit 15 receives the result of the job extraction process from the job storage unit.

Moreover, in the second exemplary embodiment, the job management unit 14 stores the length limit data 701. However, in the third exemplary embodiment, the length limit data 701 is obtained from each job storage unit. The job retrieval unit 15 obtains the length limit data 701 from each job storage unit and obtains the minimum value in step S2001 (illustrated in FIG. 20) of the character string truncating process of step S1907.

Furthermore, in the third exemplary embodiment, each job storage unit stores the job management data 702. Therefore, the job retrieval unit 15 in the third exemplary embodiment does not need to perform the job management obtaining process of step S2101 in the job extraction process of step S1907. Other processes are similar to the second exemplary embodiment.

When a client PC retrieves a job from a plurality of external printers, the total number of jobs from which the desired job is to be retrieved increases. Additionally, when the total number of search target jobs increases, the amount of data communication between a client PC and a printer increases, and the speed of retrieval decreases. The third exemplary embodiment can solve such problems.

The present invention can be applied to a system including a plurality of devices (such as a host computer, an interface device, a reader, and a printer), or an apparatus composed of a single device (such as a copying machine or a facsimile machine).

The present invention can also be achieved by providing a storage medium, which stores software program code for realizing the functions of the above-described exemplary embodiments, to a system or an apparatus. The program code stored in the storage medium can be read and executed by a computer (a central processing unit (CPU) or amicro-processing unit (MPU)) of the system or the apparatus.

In this case, the software program code itself realizes the functions of the above-described exemplary embodiments. The software program code itself and the storage medium, which stores the software program code, constitute the present invention.

Furthermore, the above-described exemplary embodiments can be realized by executing program code read by a CPU. An operating system (OS) or the like running on a computer can perform a part or the whole of processes according to instructions of the program code and realize the functions of the above-described exemplary embodiments.

Furthermore, program code read from a storage medium can be stored in a memory equipped in a function expansion board inserted in a computer or a function expansion unit connected to a computer, and a CPU in the function expansion board or the function expansion unit can execute all or part of the processing based on the instructions of the program code to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346198 filed Dec. 22, 2006, which is hereby incorporated by reference herein in its entirety.

What is claimed is:

1. An information processing apparatus comprising:
a characteristic management unit configured to manage a characteristic of each of a plurality of types of storage areas that store print jobs;
a designation input unit configured to designate a storage area of a print job to be retrieved from among the plurality of types of storage areas;
a retrieval condition input unit configured to input a retrieval condition;
a processing unit configured to process the retrieval condition input by the retrieval condition input unit based on a type of the storage area designated by the designation input unit and a characteristic of a storage area managed by the characteristic management unit that corresponds to the type of the designated storage area;
a retrieval unit configured to extract, from print jobs stored in the storage area designated by the designation input unit, a print job based on the retrieval condition processed by the processing unit; and
a display control unit configured to cause a display unit to display the print job extracted by the retrieval unit as a retrieval result.

2. The information processing apparatus according to claim 1,
wherein the retrieval condition includes a character string and the characteristic includes a length limit, and
wherein the processing unit is configured to process a character string input by the retrieval condition input unit into a character string whose length is shorter than or equal to the length limit.

3. The information processing apparatus according to claim 1,
wherein the retrieval condition input unit is configured to input a character string and an attribute of a print job as an attribute of the retrieval condition, and
wherein the retrieval unit is configured to extract a print job based on the character string and the attribute of a print job from print jobs stored in the storage area designated by the designation input unit.

4. The information processing apparatus according to claim 1,
wherein the designation input unit is configured to designate a plurality of storage areas, and
wherein the retrieval unit is configured to extract, from print jobs stored in the plurality of storage areas designated by the designation input unit, a print job based on the retrieval condition input by the retrieval condition input unit.

5. The information processing apparatus according to claim 1, wherein the plurality of types of storage areas include one of a box job storage unit, a hold job storage unit, or a client job storage unit.

6. The information processing apparatus according to claim 5, wherein the box job storage unit includes a registered box previously designated from among a plurality of boxes.

7. The information processing apparatus according to claim 1, further comprising:
a communication unit configured to communicate with an image forming apparatus via a communication line; and
an obtaining unit configured to collect print jobs of each storage area when a plurality of types of storage areas including a storage area of the image forming apparatus is designated as a storage area for the print jobs to be retrieved by the retrieval unit, wherein the retrieval unit merges print jobs in each of the storage areas based on the retrieval condition as a retrieval result.

8. A method comprising:
managing a characteristic of each of a plurality of types of storage areas that store print jobs in a characteristic management unit;
designating a storage area of a print job to be retrieved from among the plurality of types of storage areas;
inputting a retrieval condition;
processing the input retrieval condition based on a type of the designated storage area and a characteristic of a storage area managed by the characteristic management unit that corresponds to the type of the designated storage area;
extracting, from print jobs stored in the designated storage area, a print job based on the processed retrieval condition; and
causing a display unit to display the extracted print job as a retrieval result.

9. The method according to claim 8,
wherein the retrieval condition includes a character string and the characteristic includes a length limit, and
wherein the method further comprises processing an input character string into a character string whose length is shorter than or equal to the length limit.

10. The method according to claim 8, further comprising:
inputting a character string and an attribute of a print job as an attribute of the retrieval condition; and
extracting a print job based on the character string and the attribute of a print job from print jobs stored in the designated storage area.

11. The method according to claim 8, further comprising:
designating a plurality of storage areas; and extracting a print job based on the input retrieval condition from print jobs stored in the plurality of storage areas.

12. The method according to claim 11, further comprising:

communicating with an image forming apparatus via a communication line;

collecting print jobs of each storage area when a plurality of types of storage areas including a storage area of the image forming apparatus is designated as a storage area for the print job to be retrieved; and merging print jobs in each of the storage areas based on the retrieval condition as a retrieval result.

13. The method according to claim 8, wherein the plurality of types of storage areas includes one of a box job storage unit, a hold job storage unit, or a client job storage unit.

14. The method according to claim 13, wherein the box job storage unit includes a registered box previously designated from a plurality of boxes.

15. A non-transitory computer-readable storage medium storing a computer program which when run on a device causes the device to:

manage a characteristic of each of a plurality of types of storage areas that store print jobs;

designate a storage area of a print job to be retrieved from among the plurality of types of storage areas;

input a retrieval condition;

process the input retrieval condition based on a type of the designated storage area and a managed characteristic of a storage area that corresponds to the type of the designated storage area;

extract, from print jobs stored in the designated storage area, a print job based on the processed retrieval condition; and cause a display unit to display the extracted print job as a retrieval result.

* * * * *